(12) United States Patent
Fan

(10) Patent No.: US 7,672,022 B1
(45) Date of Patent: *Mar. 2, 2010

(54) METHODS AND APPARATUS FOR ANALYZING AN IMAGE

(75) Inventor: Jian Fan, Cupertino, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1839 days.

This patent is subject to a terminal disclaimer.

(21) Appl. No.: 09/709,685

(22) Filed: Nov. 9, 2000

Related U.S. Application Data

(63) Continuation-in-part of application No. 09/545,223, filed on Apr. 7, 2000, now Pat. No. 6,757,081.

(51) Int. Cl.
*H04N 1/04* (2006.01)
(52) U.S. Cl. .............. 358/474; 358/1.15; 358/3.27; 358/448; 358/2.1; 358/1.9; 382/164; 382/199; 382/224; 348/207.99
(58) Field of Classification Search ............. 358/1.9, 358/2.1, 2.99, 3.01, 474, 501, 505, 509, 518, 358/448, 462, 1.1, 1.15, 1.2, 3.27; 382/173, 382/181, 199, 205, 162, 165, 186, 176; 348/207.99
See application file for complete search history.

(56) References Cited

U.S. PATENT DOCUMENTS

| | | | | |
|---|---|---|---|---|
| 4,700,224 A | * | 10/1987 | Miyasaka et al. | 382/152 |
| 4,751,585 A | * | 6/1988 | Shibazaki | 358/464 |
| 5,056,154 A | * | 10/1991 | Aono et al. | 382/246 |
| 5,680,479 A | | 10/1997 | Wang et al. | |
| 5,754,312 A | * | 5/1998 | Fujimoto et al. | 358/2.1 |
| 5,777,758 A | * | 7/1998 | Tanabe | 358/1.9 |
| 5,818,978 A | * | 10/1998 | Al-Hussein | 382/296 |
| 5,909,505 A | * | 6/1999 | Katayama et al. | 382/164 |
| 5,956,468 A | * | 9/1999 | Ancin | 358/1.9 |

(Continued)

FOREIGN PATENT DOCUMENTS

JP    5-130406    5/1993

(Continued)

OTHER PUBLICATIONS

Okun et al.; "Text/graphic separation for technical papers"; 2. San Jose, Feb. 6-7, 1995, Bellingham, SPIE, US vol. Conf. 2, Publication Date: Jun. 2, 1995; pertient pp. 1-4, 6, 7.

(Continued)

*Primary Examiner*—Negussie Worku

(57) ABSTRACT

A method analyzes an image to be scanned and analyzes at least part of the image pixel-by-pixel. Elements in the image are characterized according to a perceived characteristic and each image element having a given characteristic that is adjacent a similar or identical image element is identified. In one form, there are preferably at least three different characteristics, such as black, background and edge, by which the image elements can be characterized. In another form, image elements that are close enough to each other in physical location and close enough to each other in image characteristic are grouped together or included in a blob. Sub-blobs can be found to be part of a more predominant blob. In a further form, image elements are identified that represent an edge in the image, along with identifying those edge elements that are adjacent at least one other edge element.

55 Claims, 20 Drawing Sheets

U.S. PATENT DOCUMENTS

| | | | | |
|---|---|---|---|---|
| 6,009,196 | A * | 12/1999 | Mahoney | 382/176 |
| 6,141,460 | A * | 10/2000 | Amer et al. | 382/257 |
| 6,400,844 | B1 * | 6/2002 | Fan et al. | 382/173 |
| 6,404,917 | B1 * | 6/2002 | Kondo et al. | 382/166 |
| 6,449,065 | B1 * | 9/2002 | Luther et al. | 358/534 |
| 6,535,254 | B1 * | 3/2003 | Olsson et al. | 348/607 |
| 6,535,630 | B1 * | 3/2003 | Saeki | 382/162 |
| 6,728,391 | B1 * | 4/2004 | Wu et al. | 382/101 |
| 6,753,976 | B1 * | 6/2004 | Torpey et al. | 358/1.9 |
| 6,757,081 | B1 * | 6/2004 | Fan et al. | 358/474 |
| 6,847,377 | B2 * | 1/2005 | Kitahara et al. | 345/600 |
| 7,116,836 | B2 * | 10/2006 | Rising, III | 382/254 |
| 7,379,687 | B2 * | 5/2008 | Kawasumi | 399/110 |
| 7,502,145 | B2 * | 3/2009 | Banton et al. | 358/3.27 |
| 7,538,907 | B2 * | 5/2009 | Nagasaka | 358/1.9 |
| 7,599,101 | B2 * | 10/2009 | Ogiwara et al. | 358/450 |
| 2007/0103744 | A1 * | 5/2007 | Chiba | 358/518 |

FOREIGN PATENT DOCUMENTS

| | | |
|---|---|---|
| JP | 6-309437 | 11/1994 |
| JP | 8-139933 | 5/1996 |
| JP | 9-167233 | 6/1997 |
| JP | 11-120331 | 4/1999 |
| JP | 11-239363 | 8/1999 |
| WO | WO94/16402 | 7/1994 |

OTHER PUBLICATIONS

Pulli et al: "Range Image Segmentation Based on Decomposition of Surface Normals" Computer Laboratory, Dept. of Electrical Engineering University of Oulu 90570 Oulu, Finland.

Translation of Japanese Office action in counterpart JP application No. 2002-556,841, 4 pages (Aug. 7, 2007).

K. W. Yong, R. G. Casey and F. M. Wahl, Document Analysis System; IBM J. Res. Develop., vol. 26, No. 6, pp. 647-656, Nov. 1982.

J. Kittler and J. Illingworth, Minimum Error Thresholding; Pattern Recognition, vol. 19, No. 1, pp. 41-47, 1986.

Rafael C. Gonzalez and Paul Wintz, Digital Image Processing; Addison-Wesley Publishing Company, pp. 30-33, Second Edition, 1987.

Berthold Klaus Paul Horn, Robot Vision; The MIT Press, pp. 69-71, 1986.

* cited by examiner

FIG. 5

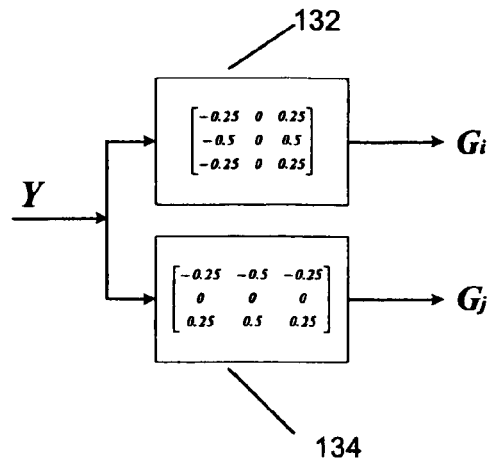

FIG. 6

$$C(Y, \|\nabla Y\|, Chroma) = \begin{cases} \text{WHITE}, & chroma < T_c \text{ AND } \|\nabla Y\| < T_e \text{ AND } Y \geq T_w \\ \text{WHITE EDGE}, & chroma < T_c \text{ AND } \|\nabla Y\| \geq T_e \text{ AND } Y \geq T_w \\ \text{GRAY}, & chroma < T_c \text{ AND } \|\nabla Y\| < T_e \text{ AND } T_g \leq Y < T_w \\ \text{GRAY EDGE}, & chroma < T_c \text{ AND } \|\nabla Y\| \geq T_e \text{ AND } T_g \leq Y < T_w \\ \text{BLACK}, & (chroma < T_c \text{ AND } Y < T_g) \text{ OR } Y \leq 30 \\ \text{COLOR}, & chroma \geq T_c \text{ AND } \|\nabla Y\| < T_e \\ \text{COLOR EDGE}, & chroma \geq T_c \text{ AND } \|\nabla Y\| \geq T_e \end{cases}$$

(Equation 2.)

(a)    (b)    (c)

Box 1. Pseudo-code for the joint operation.

238

Joint ( SubBlob *pSB1, SubBlob *pSB2)

1. Trace pSB1 to the root rtSB1;
2. Trace pSB2 to the root rtSB2;
3. Combine the two root nodes by adding attribute of rtSB2 to rtSB1 and in turn joining (works the same fashion as this one) two blobs if necessary;
4. Delete SBCore associated with rtSB2;
5. Link rtSB2 to rtSB1;

Box 2. Pseudo-code for the flatten operation.

240

Flatten ( SubBlob *pSB )
1. Trace pSB to the root rtSB while short-cutting the nodes with only one reference count (for example in A=>B=>C, B is only pointed by A. In this case A can be pointed directly to C bypassing B)
2. Start from pSB again and point all link pointers directly to the root node rtSB (a)    (b)

250
252
254

METHODS AND APPARATUS FOR ANALYZING AN IMAGE

CROSS REFERENCE TO RELATED APPLICATIONS

This application is a continuation-in-part of Ser. No. 09/545,223, filed Apr. 7, 2000 now U.S. Pat. No. 6,757,081.

BACKGROUND OF THE INVENTIONS

1. Field of the Invention

The present inventions relate to methods and apparatus for analyzing images, for example analyzing scanned images, such as for identifying text, enhancing images, compression and increasing data throughput.

2. Related Art

Electronic processing of images has become commonplace. Images fixed on permanent media such as newspapers, magazines, books and photographic paper are used in many aspects of daily life. Images created electronically, such as by computer animation, digital cameras, word processors and other devices for creating graphics are also very common. Additionally, images fixed on permanent media can also be converted to electronic form in a number ways, including scanning, digital photographic imaging, and the like.

Images converted from permanent media form to electronic form are now is converted so as to be identically reproduced individual form so that any display of the electronic image is identical to the original permanent medium. Even slight differences are often noticeable to the human eye. Additionally, digitally-created images may sometimes be processed in such a way that information is lost or modified. In some situations, it may be desirable to process electronic images to improve their appearance, to change how they are manipulated in various processors or peripheral equipment, or to change how they are stored.

When digital images are produced by scanning, such as in a flatbed or feed scanner, the scanned images can be stored in any number of different formats, such as bitmaps, JPEG files, GIFs, and the like. The storage format may often be determined by the ultimate destination for the information. For example, information incorporated into a Web page may be stored in a different format than information incorporated into a word processing document, which may be different from the storage method for use in an audiovisual presentation. Additionally, information that is received only in all text form, or in text form combined with graphical or pictorial images, may be sent to a word processing application for editing.

In many instances, the destination for a scanned image determines how the image is initially scanned, such as the scan settings. For example, if an image is text only, the scan can be set to a low bit depth and high-resolution so that the image is best suited for Optical Character Recognition (OCR), reproduction and printing. For a graphical or pictorial image, the scan settings are more often set for a high bit depth and lower resolution. Therefore, for a text-only document being put into electronic or digital form, for subsequent editing, the scan settings should be a low bit depth and high-resolution. Before a preview scan of the image, and at least before any final scan, the scanner should be set at 300 dpi and black and white. The resulting image can then be processed, such as de-skewing, auto cropping and OCR.

Many image scanners include a user interface by which the user can select the desired settings. If the necessary settings are known and can be easily applied, the desired image data should be successfully received for later processing. However, if the proper settings are not made, the resulting digital data most likely will not be in the appropriate format for the desired end use of the data. For example, an image ultimately intended to be retrieved as an editable text document that is scanned with a low resolution and a high bit depth will not produce a data file that can be suitably processed through OCR.

Scanned images are often processed after scanning to make the images appear more like the original document. For example, a scanned text document which is intended to be displayed only as a picture or graphic depiction of the original may depict the text on a light gray or slightly yellow background because the digital data representing the background is not always given or assigned a zero value or other numerical value representing 100 percent white. Therefore, the image will not appear like the original. To improve the appearance, the image data file is processed to bring the background closer to white. Additionally, the image data file may be processed to make the text appear sharper. However, if the correct settings are not applied to the scanner, or if the proper destination for the digital data is not selected, the desired processing may not be carried out on the image.

Different hardware and scanners and different environments produce different scan results for a given image. For example, different digital values can be assigned to all black and all white pixels. Consequently, the point at which a pixel will be treated as white or as black may cause some pixels to be identified as black or white and other pixels to be a shade of gray. With color scanners, detected colors, including black and white may vary as a function of temperature and ambient light. An all black and white image may be converted to digital data that would be displayed with the light gray or light yellow background. Additionally, parts of the black text may be depicted as dark shades of gray. Consequently, if the image is not properly characterized as black text, the image may not be properly processed, and it would not be displayed in such a way as to look like the original.

SUMMARY OF THE INVENTIONS

Methods and apparatus are described for analyzing and processing images. In one or more aspects of the inventions, images can be segmented or isolated based on one or more characteristics of the images or parts of the images. Image interiors can be more easily recognized, and variations within an image can be more easily analyzed and processed appropriately. Images can be more easily enhanced, including in some situations enhancement of the content of an image. In one aspect of one of the present inventions, edges can be made more pronounced or sharp, which may facilitate text recognition, for example, and color and black and white portions of images can be enhanced for more of a true reproduction. In accordance with one or more other aspects of one of the present inventions, image enhancement can be carried out more uniformly than previously possible, for example so that common features can be processed in the same or similar ways. In some situations, processing of the image can help to provide the ability to compress the image data.

In accordance with one aspect of one of the present inventions, a method is provided for analyzing an image by characterizing elements in the image according to a perceived characteristic and identifying each element having a given characteristic that is adjacent a similar or identical element. Preferably, there are at least three different characteristics by which the image elements can be characterized. In one preferred embodiment, adjacent elements having similar or identical characteristics are linked, correlated, tagged or otherwise related to be a group, sometimes called a blob. Thereafter, for example, the group or blob can be processed separately from other image elements. Preferably, the ability to segment portions of an image, for example to be processed separately, allows more selective enhancement, more uniform color and black and white treatment or improved image rendering, depending on what process is used after the image is analyzed. Images can be received from a wide variety of sources, including scanners, image capture devices such as cameras, and application software such as Word, Paint and Adobe.

In another aspect of one of the present inventions, images are analyzed by characterizing pixels in the image. Each pixel is characterized as having a given characteristic, such as background, non-background, color, gray or black. Pixels that are close enough to each other in physical location and close enough to each other in image characteristic are grouped together or included in a blob. In one preferred embodiment, physical proximity is set so that only those pixels immediately next to at least one other pixel having the selected image characteristic are grouped together. For example, proximity can be evaluated using an eight-neighbors system. In another embodiment, "image characteristic" proximity is set so that each pixel to be included in the group or blob meets a particular threshold requirement. For example, all background pixels may be required to have a luminance value above a certain threshold, and all pixels to be labeled as black or black edge may be required to have a luminance value below a certain threshold. Selection of threshold values or other criteria for characterizing pixels or image elements can be determined empirically, and may be influenced by the source of the image.

In a further aspect of one of the present inventions, image elements can be characterized using a number of criteria. For example, one criterion could be a numerical cutoff or threshold, such as the threshold for characterizing pixels as black or white, gray or color, and the like. Additionally, image elements can be characterized using more than one criterion such as spatial changes in luminance values, for example that may be determined by a gradient operator, or in other ways. Spatial changes in luminance or other values can be used to identify pixels representing an edge, for example.

In an additional aspect of one of the present inventions, pixels are grouped in a hierarchical way as sub-Blob and Blob. The number of pixels of a given characteristic in the Blob, or a sub-Blob, can be compared to a selected threshold as a measure of what type the Blob is, such as picture. The comparison can be made when the pixels are being characterized, or later, during enhancement or other processing, such as where the type of enhancement depends on the type of pixel. In one example of a comparison, the number of pixels that are black, color and gray are counted. If there is a relatively large number of non-black pixels (color and/or gray) in the sub-blob, the Blob can be classified as Picture. If there is a relatively large number of pixels that are black, for example, relative to a selected threshold, and few that are color or gray, the Blob pixels can be treated as or converted to black pixels. For example, sub-blob pixels can be converted by changing the luminance values to be equal to an average of the luminance values of the blob pixels. In another example, the luminance values of the pixels in sub-blobs can be changed to a value that is a known ratio or percentage of the average of the luminance values of the blob pixels. Other adjustments can be made as well.

In a further aspect of one or more of the present inventions, the pixels in the Blobs as a group can be compared to a selected value or threshold. If the pixels are greater than a selected threshold, the blob can be treated or characterized as picture or graphic, whereas if the number of pixels of a given type is less than a selected threshold, the blob can be characterized as something else. For example, if the blob is black except for the sub-blobs, and the number of pixels in the sub-blobs is small, the blob may be treated as black text. Alternatively, if the blob is color or gray, the sub-blobs can be enhanced, as desired.

In one aspect of another of the present inventions, elements of an image are processed by identifying elements that represent an edge in the image and identifying those edge elements that are adjacent at least one other edge element. Being adjacent, or spatial proximity, is preferably one pixel away. Recognizing an edge is helpful in a number of situations. Edge detection is helpful for enhancement of text images. Additionally, edge detection for a picture or graphic region in a mixed image of text and graphic is helpful for recognizing areas where more gradual transitions are desired, such as a gradual transition from one graphic area to an adjacent graphic area. In some situations, with a mixed image of text and graphic, the procedures used to enhance text are preferably not the same procedures as are used to enhance the graphic regions. For example, sharpening edges between text and background is preferably not used on edges of graphic regions, where softer or more gradual transitions are preferred.

In a further aspect of another of the present inventions, elements of an image representing an edge are identified using a gradient operation and then analyzed to determine which edge elements are adjacent to at least one other edge element. In this aspect, the gradient operation takes into account spatial changes in luminance or other image element criteria to help in characterizing a given pixel. Other relationships of pixel characteristics can also be used to characterize pixels as desired. Additionally, the step of identifying adjacent edges preferably uses the eight-neighbors system. Adjacent edge image elements are preferably identified with a unique label or pointer so that they can be grouped together, such as in a sub-blob, and, for example, processed, enhanced or otherwise operated on as a group. In one preferred form, edge image elements can be processed using un-sharp masking.

In another aspect of one of the present inventions, elements of an image representing one of at least three image characteristics are identified and those adjacent at least one other image element with the same or similar image characteristic are grouped together, such as in a sub-blob. Preferably, the grouping occurs after the image elements are characterized according to the at least three characteristics. In one example, the characteristics include black, edge and background. In another example, the characteristics include black, gray, gray edge, and background. In a further example, the characteristics include black text, gray text, picture or graphic and background. In a still further example, the characteristics may be white, white edge, gray, gray edge, black, color and color edge. Other characteristics may be used as desired, such as according to the image characteristics sought to be isolated and the methodologies used to isolate or identify the desired characteristics. Preferably, image elements having the same or substantially the same characteristics are characterized the same, and, for example, are given the same label or other tag. Those having the same label and are adjacent to at least one other element having the same label are preferably grouped together, and preferably given or assigned the same pointer.

In a further aspect of one of the present inventions, elements of an image representing one of at least three image characteristics are identified. Those adjacent at least one other image element with the same image characteristic are grouped together in a first group. The number of image elements in the group is calculated and compared to a selected threshold. Such a determination can be used to select between a number of possible enhancement methods for enhancing the image. For example, image elements grouped as a text character may include among them relatively much smaller groups of image elements representing anomalies that may have been detected with sensitive equipment. If the number of image elements making up the smaller groups of anomalies is relatively small, those image elements can be processed to be closer to the text-character group of image elements. Other processing steps, depending on the type of image elements and the sizes of the groups, may include smoothing, averaging, edge sharpening, and the like.

These and other aspects of the present inventions may be considered further in conjunction with the drawings, a brief description of which follows, and the detailed description of the preferred embodiments.

BRIEF DESCRIPTION OF THE DRAWINGS

FIG. 5 is a block diagram and graphical representation of a gradient computation using Sobel masks.

FIG. 6 is a depiction of a system of equations for use in pixel classification by luminance and chroma.

DETAILED DESCRIPTION OF THE PREFERRED EMBODIMENTS

Figure 1:
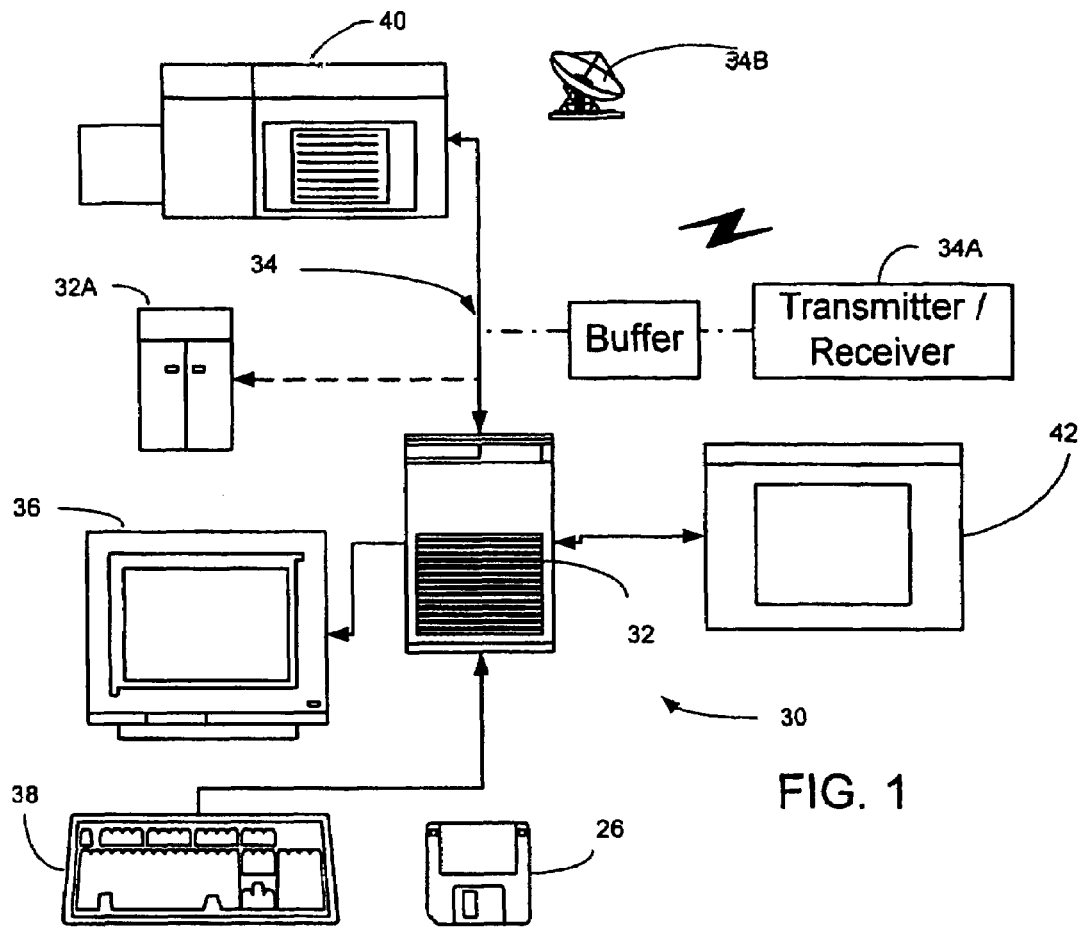
FIG. 1 is a schematic diagram of a system for analyzing images and producing an output for peripheral devices or modified data files for subsequent use, in accordance with several aspects of the present inventions.

The following specification taken in conjunction with the drawings sets forth the preferred embodiments of the present inventions in such a manner that any person skilled in the art can make and use the inventions. The embodiments of the inventions disclosed herein are the best modes contemplated by the inventor for carrying out the inventions in a commercial environment, although it should be understood that various modifications can be accomplished within the parameters of the present inventions.

Methods and apparatus are described for analyzing images, for example to permit image segmentation, recognition of image interior portions, improved image enhancement, and/or to permit data compression or other processes. One or more of the methods permits easier image characterization, for example at multiple levels, allows disassembly of image layers or segments, takes into account a number of color attributes, can make easier such image enhancements as edge sharpening, selective and uniform image enhancement, color and black and white enhancement or enhancement of color text. More precise image rendering is possible, and image enhancement based on image content can be improved. Image processing can also be improved, for example, by removing or modifying color anomalies that may have been generated in an otherwise black and white, text document, thereby making printing of the black and white document on an inkjet printer more efficient by reducing the use of color ink cartridges. In one application of one of the present inventions, image characterization can be used to identify an image such as one from a scanner as one of either all text, all graphic or picture, or a mixture of both text and graphic. Such information can then be used to establish scanner settings, parameters used in image enhancement, as well as for other purposes.

In the context of methods for scanning and analyzing images, methods and apparatus are described for analyzing images having particular application to analyzing scanned images in order to reliably identify text and identify graphic. The proper identification of text is relevant to ensuring that the data from the scanned image is in the most desirable form, such as high-resolution and low bit depth. If the image data is not in the most desirable form, the image can be re-scanned with the scanner set with the desirable settings, or the image data may be in a form that can be processed and placed in the desired form. Proper identification of an image is also relevant to ensuring that the data from the scanned image is in the most desirable form for output to a peripheral device or later processing in a specific application, or conversely, to ensure that the data is being sent to the device or application that can best process it. Proper identification of graphic images is also important for similar reasons. For example, pictorial data may be enhanced or modified prior to display or output, making it relevant to ensuring that the full dynamic range of the data is available.

It should be understood that the reference to an image and image data corresponds to all or any portion of an image on a document or other medium. For example, many documents include only one type of image, such as text only, or graphic only. Documents also may include a mixture of these two on the same page, such as graphic image in one region of the page and text only in another region of the page. Additionally, text can appear in an image as part of a graphic image, and users may have no desire to convert the text/graphic image to another form, such as pure black text to be edited. Therefore, reference to an image and image data may correspond to all or only part of the content of a document or other medium. It is intended that one or more aspects of the present inventions can operate on all parts or only portions of images as desired.

In accordance with one aspect of the present inventions, a system 30 (FIG. 1) for analyzing, characterizing an image may include a processor or a CPU 32 for receiving and processing image data or a portion of image data to be analyzed. Images can be received from a number of sources, including as an existing electronic file such as from a storage device, externally such as from a scanner or other imaging device, or from applications programs for digitally or synthetically creating images. The processor may include a storage device for storing data as a default if no other destination is selected by a user or established as a default, or the image data may be stored remotely. Image data can be sent over a network or communications link 34 to a display, viewing or projection device 36, which can be a color or black and white monitor or other viewing device. A keyboard 38 or other input device, such as a mouse, may be used to send commands or input data to the processor 32. For example, the keyboard can be used to select or confirm settings for a scanner 40 linked or otherwise in communication with the processor 32 over the network 34, or to select one or more destinations for the data. The system may also include a printer or other output device 42 for receiving image or other data from the network 34. The scanner and printer may be a combined unit, or acting as a combined unit, for example to function as a copier, and other configurations are possible as well.

The scanner 40 may be a conventional flatbed scanner, a continuous feed, sheet-fed or scroll-fed scanner or other media-transport device that can sense information on a medium, such as on a document. The particular mode of acquiring data from the medium can take any number of forms, but the discussion of the present inventions will include examples using document scanners using light to acquire data representing an image on the document.

Applications or applications programs that may benefit from one or more of the methods of the present inventions include procedures that operate on image segments, that provide image enhancement, data compression, optical character recognition and that provide photo processing. According to one aspect of the present inventions, segmentation of an image into separate parts allows different operations to be applied to the separate image segments. For example, enhancement of a black text portion of an image may concentrate on edge sharpening and making the text characters uniformly black. Portions of the interior of the text character can be recognized and evaluated to insure the proper treatment of those interior portions and to increase the likelihood that the image will be properly presented. Recognition of interior portions also helps to properly characterize oversized text characters which might otherwise have been characterized as a graphic image. Enhancement of a graphic portion of the same image may concentrate on smoothing transitions within the graphic portion. Segmentation also allows for approved recognition of text which may be skewed to a greater extent than is recognized by conventional de-skewing routines. It also improves the proper recognition of text which does not follow conventionally-recognized spacing or other standard presentation modes. Segmentation also improves proper image recognition even with variations in color within the same image.

Enhancement of images can be made easier using one or more aspects of one of the present inventions, where enhancement can be carried out based on the content of the page, such as text, graphic and background characteristics. Text enhancement can be made easier where text regions are more easily recognized and where any extraneous color information can be removed, such as from white background, the interiors of text characters, and the like. Text enhancement can make text characters look cleaner and make them more recognizable for optical character recognition.

Edge and interior enhancement is also made easier by improving the ability to recognize edges and recognize interior image portions. Edge sharpening is improved, especially where edges can be separately isolated. Interior regions can also be separately processed, for example where a connectivity analysis links together all image elements having similar characteristics in a given region, even, for example, for small as well as large characters. The ability to appropriately control or determine the desired enhancement of interior graphic regions is also improved when those interior regions can be identified, for example, as all part of one region.

Data compression of images can also be improved with appropriate segmentation and identification of text, especially black text documents. Black characters can be easily stored as binary information, while other, more data intensive segments can still be stored without loss of significant information.

Figure 2:
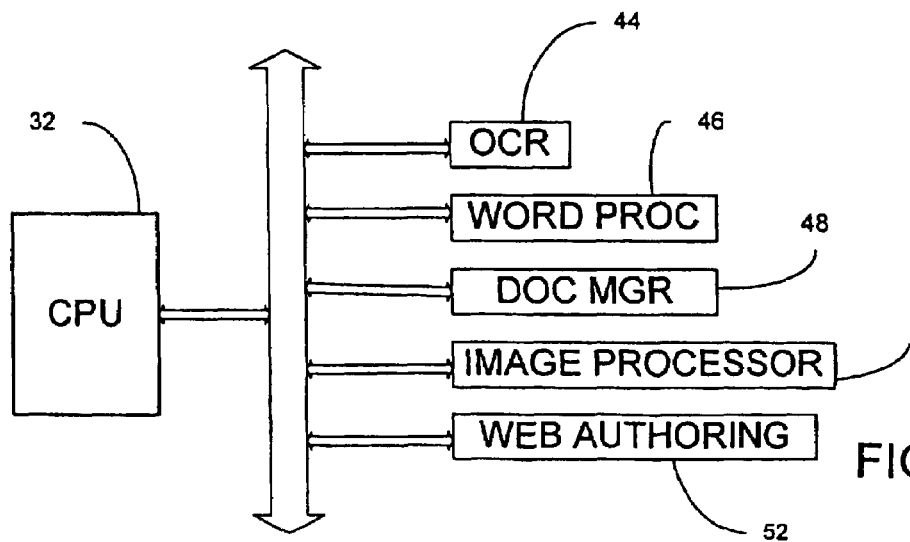
FIG. 2 is a schematic block diagram of a system for analyzing images and destination applications for receiving a data file.

Once an image is processed, there are a number of destinations to which the CPU 32 (FIG. 2) could send the image file, including an OCR application 44 to convert the image file to a text or other editable data file, that can be processed with a generic or other word processor 46, or a document program such as Microsoft Word 48, which can receive editable text as well as pictures, symbols, and other image files. The CPU 32 can also send the image file to an image processing program 50 such as Microsoft Paint, Adobe Photoshop, or the like. Other applications programs may include Web authoring tools 52, presentation programs such as PowerPoint, and the like. These destination applications have optimum data input formats, and the CPU 32 may automatically, or based on input from the user, preferably establish the appropriate settings for the scanner 40 so that the image data file sent to the applications programs will be in the appropriate configuration. Preferably, the CPU 32 sets the scanner 40 to acquire the data corresponding to the image at the proper resolution and bit depth necessary for optimum processing by the applications program. The CPU 32 can establish the proper settings based either on input from the user, based on the image analysis described herein, or through other means. Alternatively, the scanner can be set for optimum data acquisition corresponding to any possible image format and the CPU 32 can then process the image data file to convert it to the optimum format acceptable by the application program. For example, the image file can be configured so as to be optimized for text only for an OCR application, for text as an image, for photo applications with appropriate color and/or gray scale information or mixed for photo and text with appropriate color and/or gray scale information.

In a process in accordance with one aspect of the present inventions, the image or a portion thereof is received by the CPU 32. As previously noted, the use of the term "image" refers to all or part of an image on a document or other medium that is to be analyzed. Additionally, data representing the image can be acquired in any number of ways, including from storage, through a scanner 40, through a communications link, or the like. Moreover, the image data file can be acquired in segments or as one complete file of the entire image under consideration. Once the image is acquired, it can be processed and analyzed as desired.

Considering the image analysis and characterization step in more detail, in one form of a process for analyzing an image and characterizing the image as text only, picture or graphic only, or mixed, image data is received and elements of the image are characterized, preferably on a pixel-by-pixel basis. In one preferred embodiment, the image is segmented into regions or image segments, and in another embodiment the image areas are analyzed to identify pixels according to a hierarchy, such as blobs and sub-blobs. In another embodiment, the image areas are analyzed to identify edge portions separate from other areas of the image, for example to allow edge enhancement, and in another embodiment, the images are analyzed to identify interior regions of an image that form a part of a larger part of the image. According to one embodiment, each pixel is characterized as either white, black or color using an appropriate standard, and in another embodiment, each pixel is characterized as either white, white edge, gray, gray edge, black, color or color edge. In one embodiment, the image analysis and characterization are carried out with one purpose being the identification of text-only images. In other situations, the analysis and characterization can be carried out in order to enhance the image, to compress the image or to segment the image for further processing.

The pixel image data is also analyzed to identify appropriate relationships between pixels, especially those pixels adjacent to each other. In one preferred embodiment, pixels that are adjacent each other and that have the same characterization, such as black, white or color, are then grouped, aggregated or linked to each other and identified as connected regions, sometimes referred to as blobs. In the preferred embodiments, the characterization of parts of the image as being related is intended to recognize and take advantage of the fact that related parts of an image will have identical or similar characteristics, or at least sufficiently similar to allow those parts of the image to be treated together, either in terms of enhancement, segmentation or separation or for other purposes. For example, regions of all black text will share the characteristics that the pixels will be either black, white or relatively sharp or steep transitions between those two extremes, and black regions and white regions will be relatively uniform in intensity or luminance. On the other hand, pictorial or graphic regions, represented in gray scale, will have substantially more gray areas, softer or smoother transitions between light and dark and comparatively fewer aggregations of black and white pixels. Therefore, in the preferred embodiments, the pixels are not only analyzed for their content but also their relationship to adjacent and nearby pixels.

As an additional step in one preferred aspect of the inventions, the different characterizations are added, counted or otherwise evaluated to determine the relative magnitude, percentage or other measurement criteria corresponding to each of the different characterizations. For example, the number of black pixels, the number of white pixels and the number of graphic pixels are counted, and if the number of black pixels is significantly higher than a threshold, according to the cutoff or threshold set or established in software or otherwise, then the image can be characterized as black text. For example, in one preferred embodiment, if the number of black and white regions constitutes 95 percent of the image, the image will be characterized as black text. If the number of black and white regions constitutes less than 5 percent of the image, the image can be characterized as graphic or pictorial. If the number is between five and 95 percent, the image can be characterized as mixed. Other thresholds and characterizations can be used, as determined by a designer, and may depend on the types of images expected to be scanned or analyzed, the permissible tolerances or percentages desired, and the like. The thresholds or cutoff of five and 95 percent may be different, depending on what the designer selects as preferred criteria.

Once the image is properly characterized, the CPU 32 has additional information useful for additional processing of the image. For example, in one embodiment, the processor can then enhance the image, for example based on the content of the image. For graphic images, the processor can smooth transitions between segments or regions. For text regions, the processor can convert the pixels to gray levels or black and white for optical character recognition. The processor can sharpen edges, make background all or proportionally white and make the text characters all or proportionally black, including removing any color attributes. Consequently, color artifacts or color data produced in a black text image such as by noise or background effects can be eliminated. The processor can then print or store the image. With the enhanced text image, the image can be more efficiently printed on an inkjet printer, using the black cartridge rather than printing mostly black text characters with a color cartridge.

As another example of an application, the processor can operate on an isolated segment of the image. For example, in enhancement of text, individual text characters can be processed to make their interiors more uniform and essentially all black, to improve the appearance or to improve throughput. The appearance of text characters would be improved by making the interiors uniformly black so that their appearance is more uniform. Throughput can be improved during later processing or printing, for example, where the data representing the black characters on a white background are simplified to a binary form, thereby compressing the data file to the extent of the black text. Compression of color information can be done with a different method, if desired.

In another example, the CPU applies settings to the scanner 40 that are optimum based on the type of image being scanned. The scanner then carries out a final scan, during which the image data may or may not again be analyzed, and the image data from the final scan received by the CPU. The CPU then either stores the image data or sends it to the desired destination.

By analyzing and characterizing the image, the system can better ensure that the image is processed and rendered in the desired way. In the example of a scan process, proper characterization allows the CPU to apply the proper scan settings and improve the likelihood that the resulting image data is in the best possible form for the ultimate destination. Characterizing the image can be done without user input, and allows proper acquisition of the data more quickly.

Figure 3:
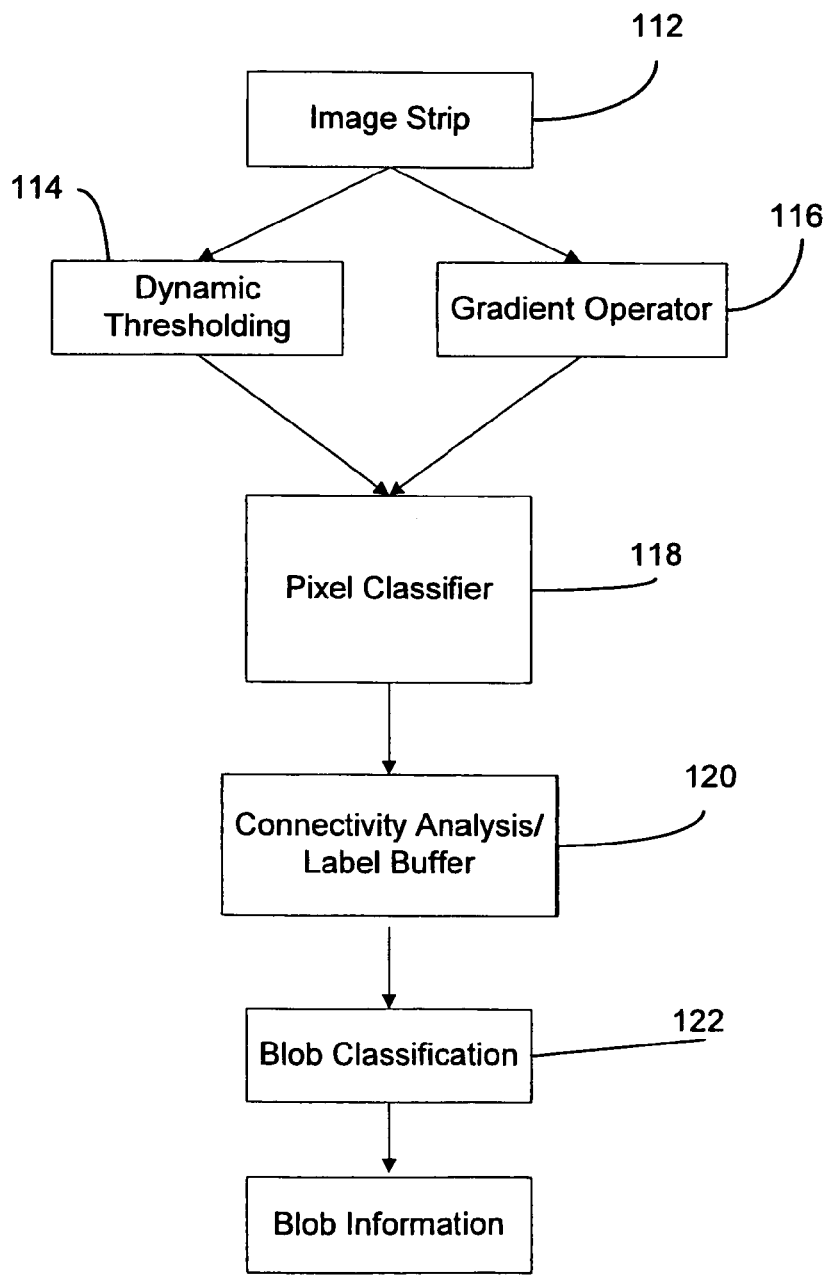
FIG. 3 is a flow chart depicting steps in a method for image analysis in accordance with one aspect of the present inventions.

Considering the image analysis step 104 in more detail, an image strip 112 (FIG. 3) has been converted to luminance form. (It should be understood that the image data can include any color or chroma information, which need not be discarded. However, for purposes of discussion, it will be assumed that the image data has been converted to luminance-only form.)

In the preferred embodiment, the image data is then processed line-by-line, and preferably on a pixel-by-pixel basis, to analyze and characterize each pixel, and, if possible, to group the pixels. The image data is checked for background levels so that digital values corresponding to true white and true black can be established. These values can remain fixed for the entire image or may be dynamically established 114 over the image. In one preferred embodiment, the CPU receives a dynamic range and white point value to establish 114 a threshold value for what will be considered white and a threshold value for what will be considered black. In the preferred embodiment, the threshold is taken as 0.95 times the value corresponding to white pixels, as determined by the Kittler-Illingworth algorithm, or generally the value of the maximum or minimum digital value of the pixels in a line or series of adjacent lines. Digital values in between will be assigned different gray scale values, and gray values may be assigned using a similar threshold determination, such as anything between 0.5 and 0.95 times the value of the white pixels, as determined by the Kittler-Illingworth algorithm. Black may then be anything equal to or below 0.5. Other or different thresholds may easily be set based on empirical factors, and the like.

The CPU uses a gradient operator 116 to determine if a given pixel represents or is immediately adjacent an edge. The processor checks to see if the data is going from light to dark or dark to light and provides a representation as to the amount of change and the direction of change. The direction of the change will indicate whether the data is going from light to dark or from dark to light. The processor then determines whether or not the change is significant or large enough to represent an edge or is slight enough to represent the more gradual changes present in photo or graphic images.

The threshold or thresholds established by the processor and the gradient values corresponding to the pixels in the line being analyzed are then used by the processor to characterize 118 each pixel. Using the threshold and the indication of whether or not the pixel is on an edge, the processor decides whether each pixel should be characterized as white, black or gray or color. If the pixel is above the threshold, it will be characterized as white, and if it is at a digital value at the other end of the spectrum (below the gray threshold), it will be characterized as black. If it is in between, and the gradient value is small (below the gradient threshold, such as below 30) or otherwise indicating a gradual change, the pixel is characterized as gray scale or color. The characterization of each pixel is then stored, along with the gradient value, if desired. Additionally, each pixel can be assigned one of more than three values, in other words intermediate values in addition to black, white or gray or color. For example, possible labels for each pixel may include dark gray, light gray, black, white, color, gray edge, color edge or other useful characterizations. The labels or characterizations and their number may depend on what the characterizations ultimately will be used for and the desired quantity and precision desired for the data.

Preferably after the pixel classifier, the processor analyzes 120 the connectivity or relationships among pixels to identify connected regions or areas of pixels that can be characterized the same or sufficiently similar to represent one type of pixel. For example, if one or more pixels immediately adjacent a given pixel has the same label, or a label that is sufficiently close to be characterized as the equivalent, those pixels will be grouped, separated or otherwise combined into one region type or other characterization. For example, all adjacent pixels labeled black may ultimately be identified as text, especially if there are a significant number of adjacent pixels that are labeled white. However, if those pixels labeled black are in or surrounded by regions of different gray scale levels, those pixels as well as the gray scale level pixels may be identified as a graphic or pictorial region, and possibly color text. The analysis is preferably based on the statistics of an area as opposed to a statistical analysis on individual pixels. Preferably, regions can then be assigned a tag or other suitable record of how it was characterized, for example, either as text and graphic or some other useful characterization. It should be noted that the connectivity process can be carried out almost simultaneously with the pixel classification, and real time if desired. Alternatively, the connectivity can be done separately, in a different process or otherwise, as desired.

With the information from the connectivity analysis, the processor can then characterize 122 each region or blob. The processor can then tabulate, sum or otherwise account for the relative numbers of text, graphic or other characterizations of regions. The image can be processed or stored, as desired. For example, where the application or destination of the image is known, the processing of the image can be completed. Where the image is to be enhanced, the text regions can be edge sharpened and the text characters made all black. The color regions can be smoothed and some color manipulation can also be done, if desired. The text and graphic regions can be compressed as well.

Where the image is to be sent to a scanner for OCR, and where the scanner is controlled by the CPU as described below, the processor can more closely control the processing of the image. For example, the processor can evaluate in real time whether the image analysis should continue or if the image data should be sent directly to the user interface or otherwise processed further. For example, if the analysis of the image strip 112 reveals that the image is all text or all graphic, the page analysis would preferably continue to determine if the rest of the image contains a significant number of pixels of the other type. If the analysis of all of an image reveals that an otherwise all text image also includes a significant amount of graphic near the end of the image, the image will be characterized as mixed. Likewise, if the analysis of all of an image reveals that an otherwise all graphic image also includes a significant amount of text near the end of the image, the image will be characterized as mixed. Conversely, if the image is all or substantially all of one type, it will be characterized as such, and the processor will continue. For example, the processor will conduct a final scan with the appropriate settings, or the processor may send the image data to the appropriate destination. If the scan was the first and final scan, the processor may convert or otherwise process the image data to place it in a form suitable for the selected or appropriate destination. For example, the data may be converted to a text only format for processing in an OCR application, or if it is converted to graphic, it may be sent to a graphic or photo application.

If the processor in the example of a scan derived image determines early in a scan that the image is mixed, in other words that the image has a significant number of pixels characterized as text and a significant number of pixels characterized as graphic, the processor can immediately characterize the entire image as mixed and discontinue the image analysis. The ability of the processor to make such an early determination is made easier by analyzing the image in strips or segments. Alternatively, the processor may continue, for example if it has the capability of isolating text blocks within an otherwise graphic image or for other processing.

In one preferred form of one of the inventions, the image analysis includes an image segmentation process by which parts of the image can be identified or characterized, such as text only segments, photo or picture only parts, or other designations. For example, the image segmentation can divide an image into connected components of text, graphics and picture, and background independent of orientation and layout. The segmentation can also be done on raster-scan mode data input/output using rotational buffers. In a preferred embodiment, the image analysis uses pixel attributes and interconnection to achieve the segmentation that is independent of orientation and layout.

In one preferred form of the image analysis, the process uses three sequential steps, which will be called pixel classification, hierarchical connected component (HCC) analysis and region or blob classification. Each of these steps will be described.

Pixel classification preferably identifies or uses image features to distinguish the different parts of the image. In one preferred embodiment where the image data is analyzed in gray scale form, those features are representations of black and white values, edge elements, and the balance, which will be called gray. In an embodiment where the image includes color data, the features used to characterize each pixel may be black, white, white edge, gray, gray edge, color and color edge. Other features or image characteristics may be used to differentiate parts of the image, but it is believed that these are particularly appropriate for many of the images that would be encountered in ordinary practice.

Figure 4:
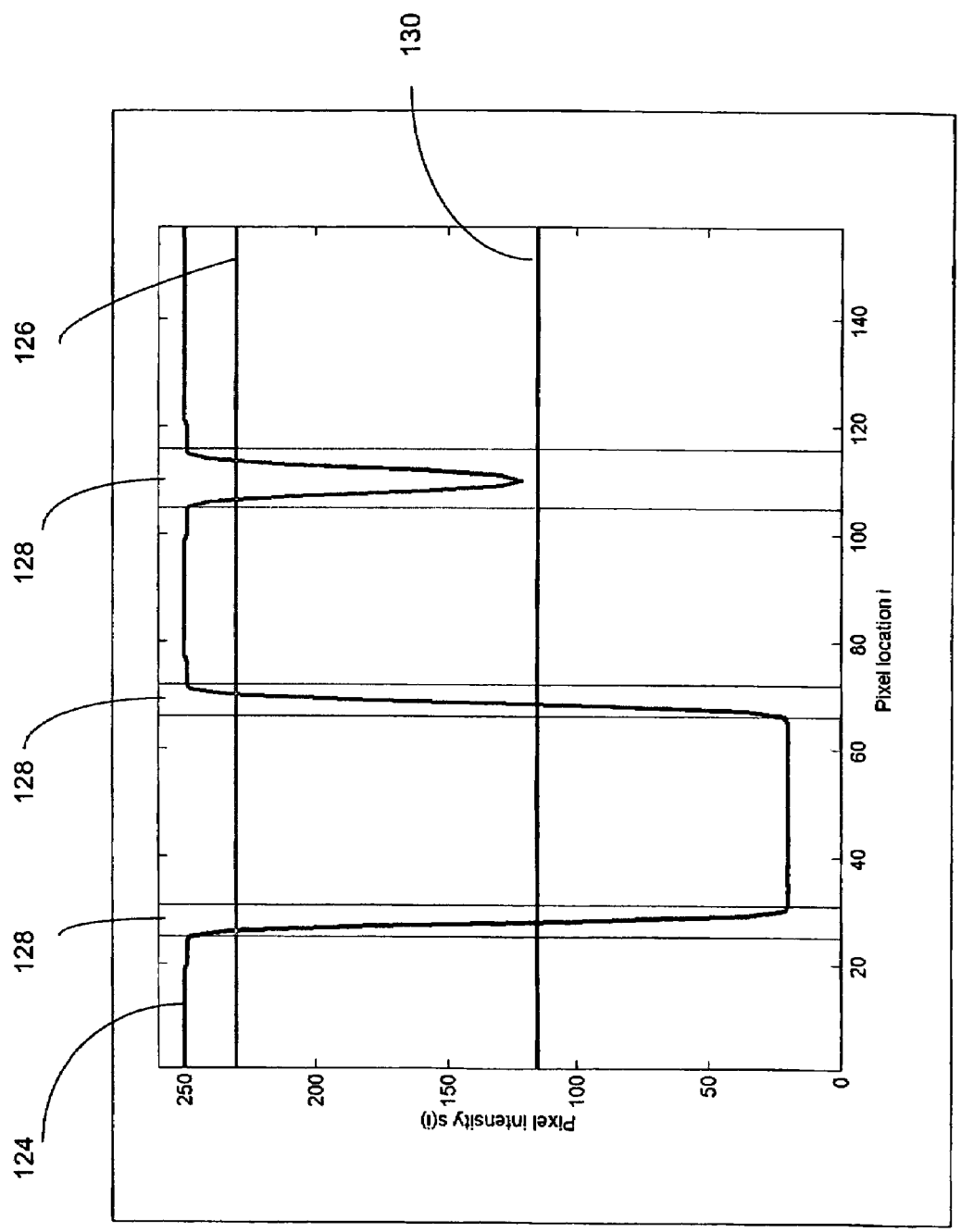
FIG. 4 is a profile of modeled black text on the light background.

For gray-scale scanned images, black text of various font sizes on a light background could be modeled by a relatively few discreet curves such as those shown in FIG. 4, which is a profile of a modeled black text on a light background. The curve 124 represents a one-dimensional profile. The profile in FIG. 4 can be divided into four sections, namely:

white background with luminance above the line 126 (white threshold);

transition section marked by the gradients or vertical line areas 128;

black interior part with luminance below the line 130 (gray threshold); and gray section with luminance in between the lines 126 and 130.

Text of relatively small font size (such as smaller than 8-point, for example, depending on image quality and scan resolution) is characterized by all-transitional area with little or no black interior part. In the preferred embodiment, the histogram-based thresholding algorithm of Kittler-Illingworth [described in J. Kittler and J. Illingworth, "Minimum Error Thresholding", Pattern Recognition, Vol. 19, No. 1, 41-47, 1986] finds a suitable white threshold, while half of the white threshold represents a suitable gray threshold. The transition area can be identified by a gradient norm (calculated by |s(i+1)−s(i−1)| in FIG. 4) with a threshold setting of about 30. In the example shown in FIG. 4, the white threshold has been set at about 230, and the gray threshold has been set at about 115.

It should be noted that several overlaps occur between the quantization of luminance and gradient (the transitions between luminance values) in FIG. 4, so that in the transition area, a pixel could possibly be characterized as one type or another, depending on how the pixel characterizations are established. In one preferred embodiment, gray pixels with high gradient are grouped with black pixels since they are most likely to belong to black text. White pixels with high gradient are grouped with white pixels in order to reduce the chance of connecting text to graphical objects. The characterization of black pixels with high gradient is mostly a matter of enhancement. In one preferred embodiment, these pixels are characterized as black pixels. In another preferred embodiment described below, high gradient gray pixels can be assigned their own label, such as gray edge or white edge, but in a basic black text analysis, WHITE, BLACK and GRAY labels are sufficient for many applications.

For evaluating two-dimensional images or other image portions, a comparable profile to that of FIG. 4 could be developed, and similar thresholds could be used to characterize the pixels. In one preferred embodiment, a pixel classification scheme can be represented by Equation 1, where $T_w$ and $T_g = 0.5 \cdot T_w$ are the white and gray thresholds, respectively, $\|\nabla Y\| = \sqrt{G_i^2 + G_j^2}$ is the gradient norm calculated by using two 3×3 Sobel operators 132 and 134 shown in FIG. 5 [described in Rafael C. Gonzalez and Paul Wintz, Digital Image Processing, second edition, Addison-Wesley, Reading, Mass., 1987], and $T_e$ is the edge threshold.

$$C(Y, \|\nabla Y\|) = \begin{cases} \text{WHITE}, & Y \geq T_w \text{ AND } \|\nabla Y\| < T_e \\ \text{WHITE EDGE}, & Y \geq T_w \text{ AND } \|\nabla Y\| \geq T_e \\ \text{GRAY}, & T_g < Y < T_w \text{ AND } \|\nabla Y\| < T_e \\ \text{GRAY EDGE}, & T_g < Y < T_w \text{ AND } \|\nabla Y\| \geq T_e \\ \text{BLACK}, & Y \leq T_g \end{cases} \quad \text{Equation 1.}$$

(Pixel classification by luminance only.)

The value of $T_e$, for example, may be about 50 or could be lower such as 40 or below, or higher. The labels "WHITE EDGE" and "GRAY EDGE" are for content-based enhancement. For the purpose of segmentation, WHITE also could be assigned to pixels of WHITE EDGE and BLACK to that of GRAY EDGE.

The luminance-only approach is also applicable to color images and achieves useful results for applications such as text/non-text layer separation for compound document compression. However, for a text enhancement application, identification of black text is preferably given precedence. For color images, a metric of colorfulness is used. The YCrCb color space is used, and the chroma is calculated to from the formula chroma=$\sqrt{C_r^2 + C_b^2}$. Although this color metric is easier to compute, this color metric achieved very similar results to the chroma calculated from the formula chroma=$\sqrt{(A^*)^2 + (B^*)^2}$ calculated in CIELA*B* color space. The pixel classification scheme using luminance and chroma is characterized by Equation 2, depicted in FIG. 6, where Tc is the colorful threshold. Where color images are processed using a metric for colorfulness, Tc may be about 15, for example. It should be noted that the pixel classification and consequently the image analysis can work on luminance-only attributes by setting Tc to 255. These thresholds provide a suitable pixel classification in many applications. However, it should be understood as to all of the thresholds given as examples that they can be adjusted up or down as desired to achieve desired results, while still taking advantage of the benefits of the inventions. Many of the thresholds may be adjustable upward or downward, for example as much as 5% or 10%, or more, to lessen or emphasize processing factors, image information, and the like, as desired. For example, higher thresholds in some instances, such as the edge threshold, may mean that certain image features are not detected as easily, such as a text or character edge, unless the image is higher quality. Those skilled in the art appreciate how changes in the thresholds will affect image analysis. Additionally, it should be understood that including a threshold value in one region or another (e.g. whether the relationship uses greater than or greater than or equal to, or less than or less than or equal to) has relatively little effect overall.

Figure 7:
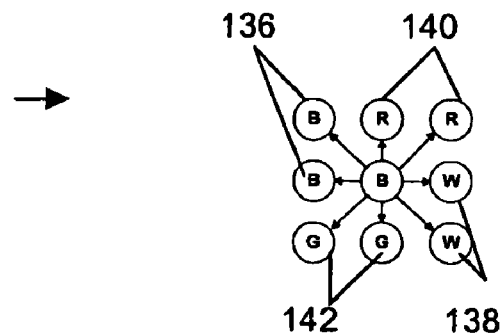
FIG. 7 is a schematic representation of pixels depicting 8-pixel-connectivity.
Figure 8:
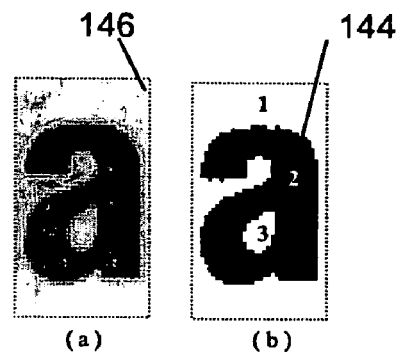
FIG. 8 is a graphical representation of an example of eight-neighbors connectivity for a gray scale image showing the original image and the connected components.

In the connected component analysis (Hierarchical Connected Component (HCC) Analysis), adjacent picture elements that can be considered sufficiently similar are given the same label or identification. In one preferred embodiment, adjacent pixels that are white, for example, are all given the same label or are all characterized the same. The 8-neighbors system is preferably used, depicted in FIG. 7, where color abbreviations and numbers are used to represent each pixel's characterization and identification. Three black (B) pixels 136 are adjacent each other, two white (W) pixels 138 are adjacent each other, two red (R) pixels 140 are adjacent and two gray (G) pixels 142 are adjacent each other. For binarized images, a two label connected component analysis works well in forming higher level visual objects from pixels, as exemplified by FIG. 8, where a connected component labeled "2" corresponds to the character "a" 144, and the labels "1" and "3" correspond to background or white, based on the original image 146.

Figure 9:
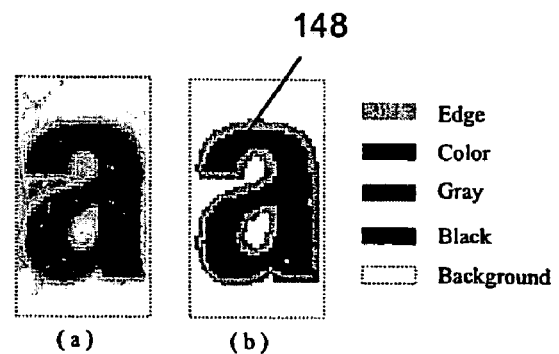
FIG. 9 is a graphical representation of an example of connected components for a color image, including the original image and the connected components.

However, for classification schemes with more than two categories of pixels, a connectivity analysis using only two labels may result in fragmentation. Fragmentation of an image portion may be seen in FIG. 9. In FIG. 9, a single character 148 consists of as many as thirty-two connected components. This is not as helpful as desired for segmentation and enhancement. Recognizing the whole character can be achieved by characterizing image elements according to more than two categories or characteristics, such as by having labels for image elements at two or more levels. The levels may be considered hierarchical connected components.

Figure 10:
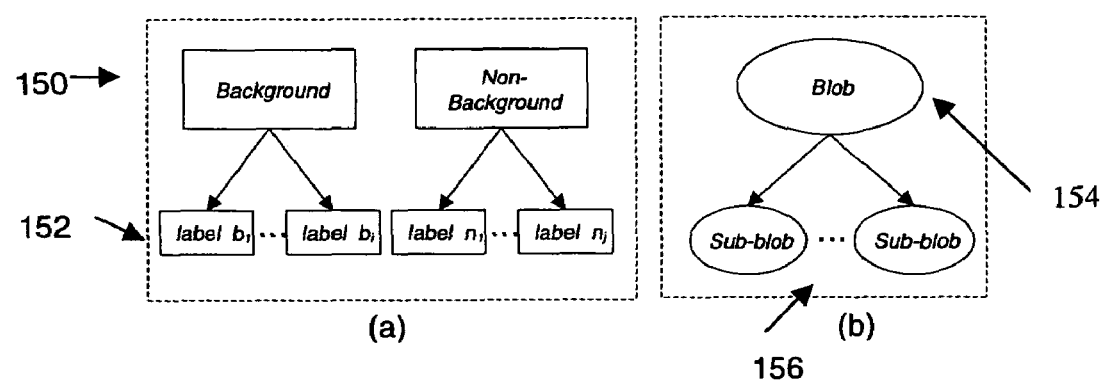
FIG. 10 is a schematic representation of two-level hierarchies for a class and for a region.

In one preferred embodiment, the hierarchical connected component analysis is used for characterizing spatial relationships among groups of pixels classified in a hierarchical fashion, such as coarse to fine. The hierarchical connected components are preferably based in part on a class or label that can be applied to a portion of the image. For many present applications, the background in an image serves as a spatial delimiter separating visual objects, for example graphic from the rest of the image, graphic from text, characters such as letters from background, and the like. Use or recognition of a background, and assignment of a background classification, can then give a hierarchy of connected components having at least two levels. At a first level, pixels are preferably classified into one of two classes, such as background or non-background. Connected components at this level are also called regions or blobs, hereafter Blobs. Two neighboring pixels belong to the same Blob if they belong to the same category of background or non-background (same classification). At the second level, in this embodiment, both background and non-background pixels are further divided into multiple subclasses, for example, black, gray, gray edge, color, color edge, etc, depending on the classification scheme. A connected component at this level is called a sub-Blob. In other words, two pixels belonging to the same sub-Blob preferably have the exact same label, such as color, gray edge or the like. FIG. 10 illustrates the two-level class (150 and 152) and Blob hierarchies (154 and 156).

In the case of a background Blob, possible sub-Blobs may be white and white edge, for example. These characterizations are useful for many of the images that would be analyzed, such as for enhancement purposes, but it should be understood that there may be images for which other characterizations could be used. In the case of a non-background Blob, possible sub-Blobs may be black, gray, gray edge, color, and color edge, or in luminance only, black, gray and gray edge instead of color.

Figure 11:
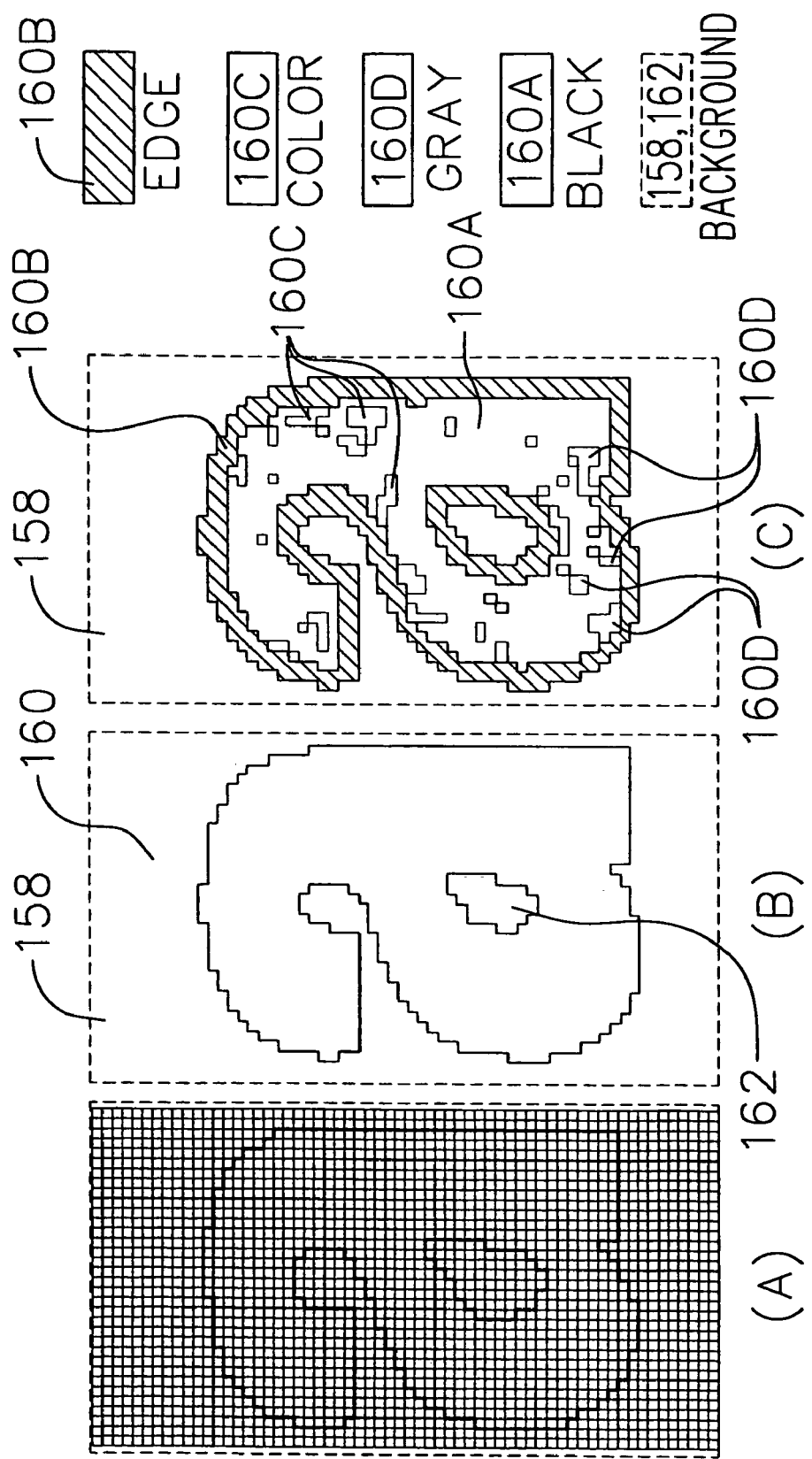
FIG. 11 is a graphical representation of an example of hierarchical connected components for a color image, including the original image, top-level connected components and sub-level connected components.

FIG. 11 shows an example of the results of a two-level hierarchical connected component analysis. There are three connected components 158, 160 and 162, at the top-level with the character as a single component, and thirty-two connected components at the sub-level.

Connectivity analysis also allows the recognition of interior areas. It also allows for correlation of image information, such as content information, with spatial information about the image. When combined with pixel classification using more than two classes or types of characterization or using two or more levels of pixel characterization, the connectivity analysis provides for more information and detail about the image being analyzed. Connectivity can be applied to multiple levels and to a number of different pixel types. Connectivity can increase the probability that objects that are placed within a larger region are properly recognized and appropriately processed. In black text characters, for example, small areas of colorfulness are more likely to be distributed or have a relatively small number of pixels. Conversely, color graphic and color text areas will have color pixels that predominate in the region.

The hierarchical connected component analysis enables grouping of pixels with certain properties in both value (for example, luminance and/or chrominance) and spatial domains as higher level objects of Blobs that somewhat correspond to what an observer perceives in an image. As a result, hierarchical connectivity analysis helps to produce more accurate Blob classification. For example, the region containing multiple sub-Blobs that are sufficiently different from each other will be less likely to be classified as a text region than the case of few or no sub-Blobs, or sub-Blobs within the Blob whose total number of pixels is relatively small compared to the complete Blob.

Preferably at the same time as the connectivity analysis, the processor correlates each pixel to a Blob and/or sub-Blob. In the preferred embodiment, each pixel is classified as either background or non-background as a Blob characterization, and each background pixel is labeled as either white or white edge as a sub-Blob characterization. Each non-background pixel is labeled as either black, gray, gray edge, color or color edge as a sub-Blob characterization. Each Blob is a region composed of a group of pixels. Each of the pixels preferably includes a label, identified below as a pointer, referring back to the Blob of which it is a part. In a preferred embodiment, there is a separate pointer for every sub-Blob throughout the image to preserve the spatial information. For any given Blob, there will be as many sub-Blobs as there are different types of pixels within the Blob.

Blob classification recognizes the existence of a higher level of information about the pixels, namely pixel character such as black, white, gray, color or edge as well as pixel location. It also adds information about a pixel by connecting it with identical or similar pixels adjacent to it. Consequently, more information exists after pixel classification, connectivity analysis and Blob classification than existed after pixel classification alone. One benefit of Blob classification is the identification of connected edge pixels. The ability to identify edges helps to properly characterize large text characters that may have interiors with a percentage of color or gray in their interiors, whether a small or large percentage of the total pixels in the character. Additionally, edges help to define and separate regions or different types of pixels from each other.

Figure 12:
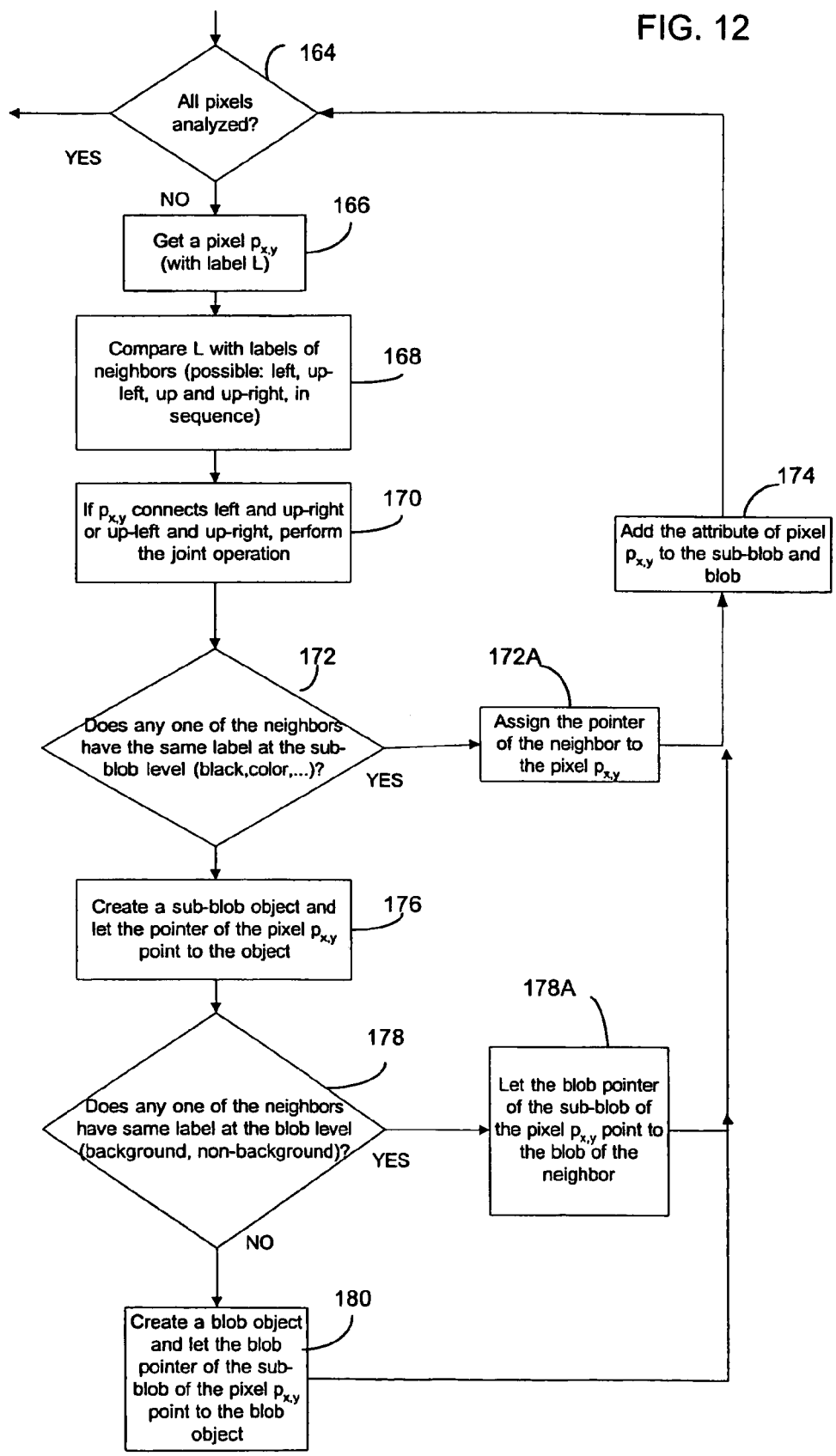
FIG. 12 is a flow chart depicting a connectivity procedure in accordance with another aspect of one of the present inventions.

In an example that can be used for classifying sub-Blobs (FIG. 12), pixels can be characterized by their pixel classification and their proximity to similar or identical pixels. In one preferred embodiment, the processor checks 164 to see if all pixels have been analyzed. If so, the processor returns, and if not, retrieves 166 another pixel $p_{x,y}$ having a label L. The processor compares 168 the pixel label L with the labels of its neighbors. For any pixel other than an edge pixel, possible neighbors include a pixel to the left, a pixel up and to the left, a pixel upward, and a pixel up and to the right. For a top edge pixel, the only neighbor will be to the left, if any. For a left edge pixel, the only neighbors will be upward and up and to the right, if any. For a right edge pixel, the only neighbors will be up and to left, upward and to the left. If the pixel $p_{x,y}$ connects to a pixel to left and upper right, or up left and up right, the processor performs 170 the joint operation. The processor then checks 172 whether any one of the neighboring pixels has the same label at the sub-Blob level, such as a white or white edge label, for a background Blob, or black, gray, gray edge, color or color edge for a non-background Blob. If any have the same label, the processor assigns 172A the pointer of that neighbor to the pixel $p_{x,y}$, and adds 174 the attribute of the pixel $p_{x,y}$ to the sub-Blob and to the Blob (FIG. 12A).

If none of the neighboring pixels have the same label, the processor creates 176 a sub-Blob object and has the pointer of the pixel $p_{x,y}$ point to the object. The processor then checks 178 to see if any of the neighboring pixels has the same label at the Blob level, in the present embodiments either background or non-background. If any do, the processor has 178A the Blob pointer of the sub-Blob of the pixel $p_{x,y}$ point to the Blob of the neighbor, and then adds 174 the attributes of the pixel $p_{x,y}$ to the sub-Blob and to the Blob (FIG. 12A). If none do, the processor creates 180 a Blob object and has the Blob pointer of the sub-Blob of the pixel $p_{x,y}$ point to the Blob object. Thereafter, the processor adds 174 the attributes of the pixel $p_{x,y}$ to the sub-Blob and to the Blob, and repeats the process until all pixels have been analyzed.

Figure 12A:
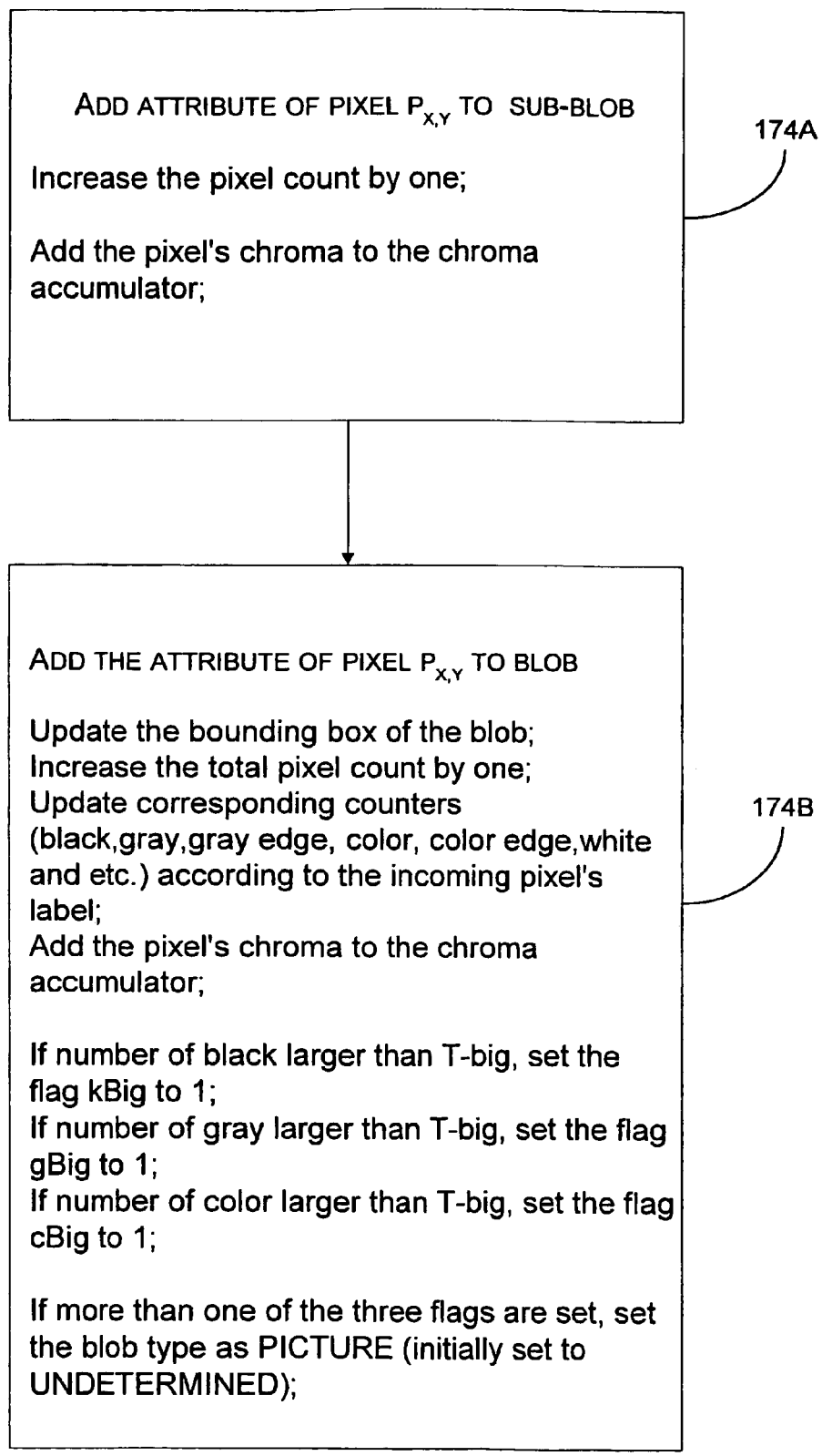
FIG. 12A is a flow chart depicting the addition of pixel attributes to sub-Blobs and Blobs representing part of the procedure of FIG. 12.

Addition of the attributes can be done in several ways, one of which is shown in FIG. 12A. The attribute of pixel $p_{x,y}$ is added 174A to the sub-Blob by increasing the pixel count by one. The pixel's chroma is also added to a chroma accumulator for the sub-Blob. The attribute of the pixel is then added 174B to the Blob. A bounding box of the Blob is updated and the total pixel count is increased by one. The bounding box is the generally taken to be the smallest rectangle containing the Blob, allowing the processor to know the spatial range of the Blob. The respective counter is also updated according to the corresponding label of the incoming pixel, for example the corresponding counters for black, gray, gray edge, color, color edge, white, white edge pixel labels. The pixel's chroma is also added to a chroma accumulator for the Blob. The processor then checks the values of the various counters against a threshold T-big. If the number of black pixels is larger than T-big, a flag k-Big is set to 1. If the number of gray pixels is larger than T-big, a flag g-Big is set to one. If the number of color pixels is larger than T-big, a flag c-Big is set to 1. The processor then checks to see if more than one of the three flags are set to 1, and if so, the Blob type is set as PICTURE from its initial setting of UNDETERMINED. The processor then continues processing pixels.

Figure 13:
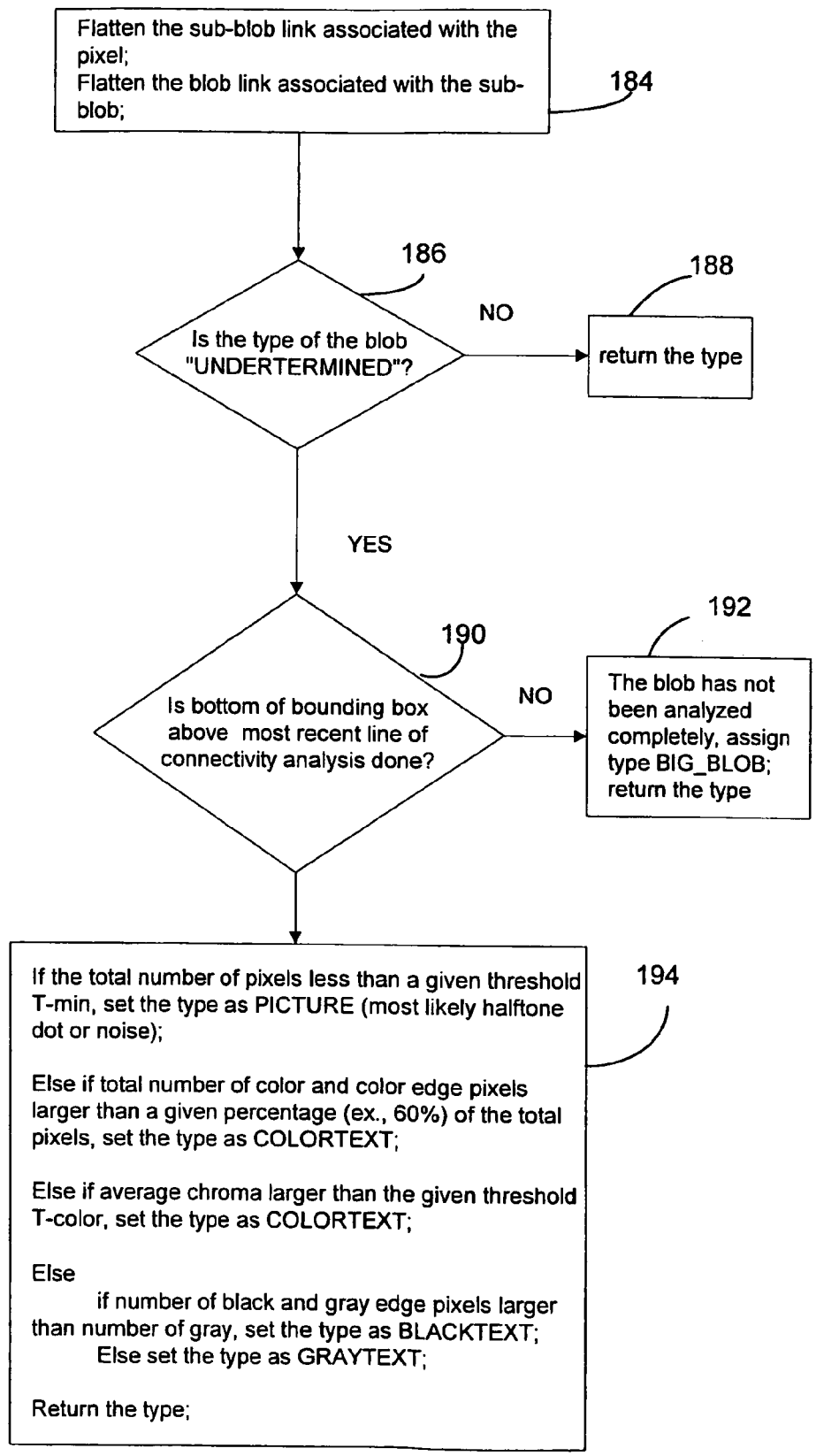
FIG. 13 is a flow chart depicting blob or image region characterization in accordance with another aspect of one of the present inventions.

When all the pixels within the buffer have been processed, the processor preferably processes the image according tithe information developed through the Blob classification in earlier steps (FIG. 13). Further processing of the image may depend on the ultimate application for the image, for example whether the image is to be printed, scanned, stored or the like. Likewise, selection of the parameters used to process the image will depend on the ultimate application of the image. For example, where the image is to be evaluated for text and picture material, the sub-Blobs can be evaluated and modified accordingly.

The hierarchical scheme is not only preferred for meaningful grouping of pixels but also provides a means of Blob characterization or "Blob Classification". This characterization scheme is based on two observations relevant to text characters compared to picture material:

(A) a text character is mainly a homogeneous cluster of pixels. This means that an HCC analysis of a text character would generally consist of a single dominant sub-Blob and another sub-Blob of edges. While there are possibly many other sub-Blobs, their sizes are generally small in a text character.

(B) Pictorial objects are usually not homogeneous. Therefore, in a typical HCC analysis of a pictorial object, the image usually consists of multiple not-so-small sub-Blobs of different types.

These observations along with the HCC framework provide one possible basis for characterizing pictorial objects:

(A) If there are multiple distinct non-edge sub-Blobs within a Blob with sizes larger than a given threshold (pixel count) $T_{big}$ (such as 15 for 150 dpi and about 60 for 300 dpi, for example; thresholds for other resolutions can be selected empirically or appropriately scaled from these values for 150 and 300 dpi), the Blob can be characterized as pictorial. This exemplifies the advantage of the two-level hierarchical analysis scheme. While it was possible to have only top-level connectivity analysis based on background or non-background and a pixel counter for every sub-class, the spatial information of those sub-class pixels could be lost.

(B) All other non-background Blobs preferably have only one dominant sub-Blob and can be characterized by this dominant sub-Blob. For example, a black sub-Blob preferably dominates a Blob characterized as black text.

While it should be understood that other relationships can be used or applied to isolate or characterize Blobs and sub-Blobs, using a threshold valuation for a text versus picture analysis is convenient and reliable. Other methods are also possible, and other pixel or Blob characteristics can be used for other purposes, such as to identify different color sub-Blobs, and the like. Selection of appropriate thresholds may depend on the ultimate application. If the only interest is in text material, gray thresholds may be ignored. If both text and graphic are of interest, both white and gray thresholds may be used. The actual values may be determined empirically.

As an example of the application of the foregoing observations, pixels can be evaluated to see if a sub-Blob characterized as color, gray or picture should keep that characterization or should be changed to black text when part of a black text Blob. In one embodiment, the processor can re-characterize pixels, as desired. In the preferred embodiment, this processing be done after a number of pixels have been analyzed, but can also be done after all of the pixels have been analyzed. For example, after the connectivity analysis over a number of lines of pixels N, the processor can retrieve and determine the pixel type of the pixels of a line corresponding to line N-D, where D represents the delay or the number of lines of the label buffer (tag 216 in FIG. 16) for the connectivity analysis. Additionally, the number of lines of the label buffer may determine the sizes of the characters that can be completely analyzed before making a decision about the characterization of a line of pixels.

For Blob characterization, the processor preferably undergoes a flattening 184 operation (FIG. 13), flattening the sub-Blob link associated with each pixel and flattening the Blob link associated with the sub-Blob. The processor checks 186 to see if the Blob type has been determined. If it has, the Blob type is returned 188, and the processor continues. If the Blob type is undetermined, the processor checks 190 to see if the bottom of the bounding box above the most recent line of connectivity analysis is done. If not, the Blob has not been completely analyzed and the processor assigns 192 a type BIG-BLOB to the Blob and returns the type, indicating that the entire blob has not been analyzed by the time a decision as to the Blob type can be made. The situation as to when a Blob might be labeled a BIG-BLOB-relates in part to the size of buffer. If the buffer size is set to be the size of whole page, there would be no BIG BLOB. What to do with the BIG BLOB designation depends on the application. For example, it may be decided to leave a large Blob un-enhanced.

If it is done, the processor then characterizes 194 the Blob. Specifically, if the total number of pixels in the Blob is less than a given threshold T-min, a threshold selected according to scan resolution and the expected smallest font size or other appropriate image attribute, the Blob type is set as PICTURE, because the analyzed portion of the image is most likely half tone dot or noise. For example, T-min may be based in part on the size of a dot over an "i" or the size of a period. Conversely, if the total number of color and color-edge pixels is larger than a given percentage, such as 60 percent, of the total pixels, the Blob type is set as COLOR TEXT. Additionally, if the average chroma (the chroma sum divided by the total number of pixels for the Blob) is larger than a given threshold T-color (Tc in FIG. 6), the Blob type is set as COLOR TEXT. Otherwise, if the number of black and gray edge pixels is larger than the number of gray pixels, the Blob type is set as BLACK TEXT. Otherwise, the Blob type is set as GRAY TEXT. The Blob type is then returned, and the processor continues until all of the image is characterized.

Figure 15:
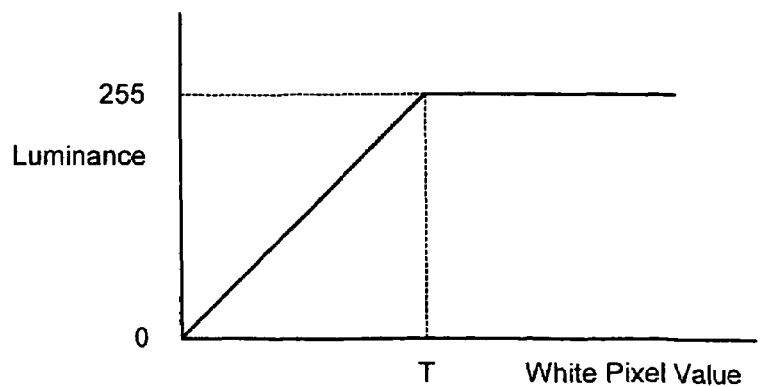
FIG. 15 is a graphical representation of a relationship between possible luminance values and actual pixel values that can be used to process pixels classified as background.

Thereafter, the image or portions thereof can be processed such as for enhancement, scanning, compression or otherwise. For example, if a Blob is characterized as background, and its sub-Blobs are a small percentage of the predominant sub-Blob, all of the sub-Blobs can be made all white or proportionately more white. In one example, the pixel values of all of the sub-Blobs can be changed to 255. Alternatively, all of the pixels in the sub-Blobs can be changed to a luminance value equal to the average of all of the pixel values in all of the sub-Blobs, or the pixels in a given sub-Blob can be changed to the average of all of the pixel values in that sub-Blob. In another alternative, the luminance values in the sub-Blobs can be changed to a percentage of 255 or of the average of luminance values in the predominant sub-Blob, or a value based on a linear relationship established empirically, or selected in some other way (FIG. 15). Conversely, any sub-Blobs in the background Blob that are classified as background edge preferably remain unchanged.

If a Blob and sub-Blob belong to a non-background, the Blob may be characterized as text. As with background, the non-edge sub-Blobs are compared to the predominant sub-Blob, and if they are a relatively large proportion of the predominant sub-Blob, they are not changed. The entire Blob may then be classified as picture or graphic. However, if the other sub-Blobs are relatively small, all color can be a removed and the luminance values of the pixels in the other sub-Blobs may be changed to a 0, a percentage such as 75 percent or 50 percent of their original values, or an average of luminance values in the predominant sub-Blob. They can also be scaled. In the preferred embodiment, averaging is preferably done on a Blob-by-Blob basis, so that the pixel values of a letter "B" will not be identical to those of letter "i". As with the background, edge sub-Blobs remain unchanged in the preferred embodiment.

Edge sub-Blobs can be enhanced separately. Edges can be enhanced by un-sharp masking or other edge-sharpening techniques.

Color text can be processed in a similar way. Edges can be enhanced, an average value can be assigned to all of the pixels in the Blob based on the average of the RGB value.

In a specific example of black text, pixels characterized as black edge can be sharpened and color information removed. Pixels characterized as non-edge black text (interior) can be darkened or made darker, and color information removed.

In an example of color text or gray text, a color edge may be sharpened, but to a lesser degree or more gradual then may be done for black text edge. Pixels characterized as non-edge color text (interior) can be enhanced as desired.

In an example of background pixels, for example white background, the background pixels can be modified as described above. They can also be processed by un-sharp masking or moiré removal. Picture pixels may also be processed by un-sharp masking or moiré removal, or by other desired processing.

Figure 14:
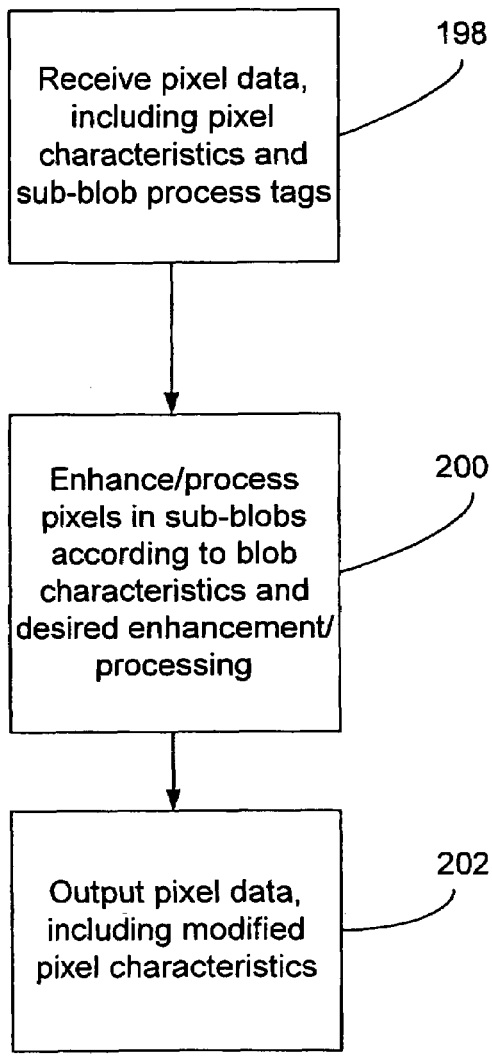
FIG. 14 is a flow chart depicting a general method used for enhancing or processing a portion of an image using the results of pixel classification, connectivity analysis and blob classification.

Generically, these processes may be described as first receiving 198 pixel data, including pixel characteristics and sub-Blob process tags, such as thresholds and the like (FIG. 14). The pixels are enhanced or processed 200 in their sub-Blobs according to the Blob characteristics and the desired enhancement or other processing steps. The pixel data is then output 202 along with the modified pixel characteristics and any other data to be used with the image information.

Figure 27:
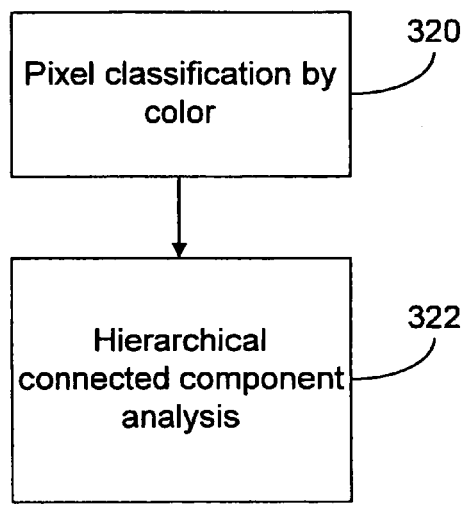
FIG. 27 is a schematic representation of an alternative method for analyzing an image.

A number of the methods can be modified while still incorporating one or more aspects of the present inventions. Moreover, parameters or settings used in conjunction with any of the methods can easily be changed while still taking advantage of one or more of the benefits provided by the inventions. Various combinations and permutations of the pixel classification methods, connectivity analysis methods and/or Blob classification methods can be used to improve image analysis. In addition to the various alternatives previously described, a different method can be used for image analysis using chroma information than is used for image analysis using luminance information only. In FIG. 27, a generic method is shown using pixel classification by color 320 followed by the connectivity analysis 322 using methods such as those previously described. Blob classification can be carried out as has been described. With this approach, pixels classified as white according to both luminance and chroma information would qualify as background, whereas pixels having significant non-white color information, such as might qualify as color background, would not be treated as background, for example for detection of text characters. For example, text on a colorful area would not ordinarily be recognized without some additional analysis.

Figure 28:
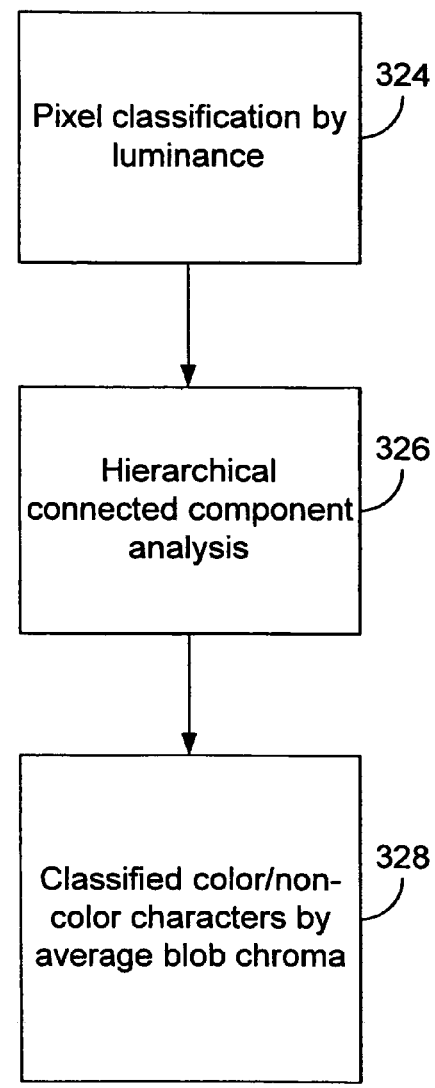
FIG. 28 is a schematic representation of a further alternative method for analyzing an image.

As another example of a method for image analysis (FIG. 28), pixel classification can be done by luminance 324 followed by the connectivity analysis 326 and blob classification 328. Blob classification could be accomplished by classifying color and non-color characters by average Blob chroma. Under this approach, for example, thresholds could be set so that pixels of high luminance would qualify as background, including colorful areas, and so that text on backgrounds of uniform color could be recognized. In this example, text could be recognized and processed in a similar way, even if the text is found on white and/or colorful backgrounds, and one or more benefits of the present inventions can still be realized.

Figure 16:
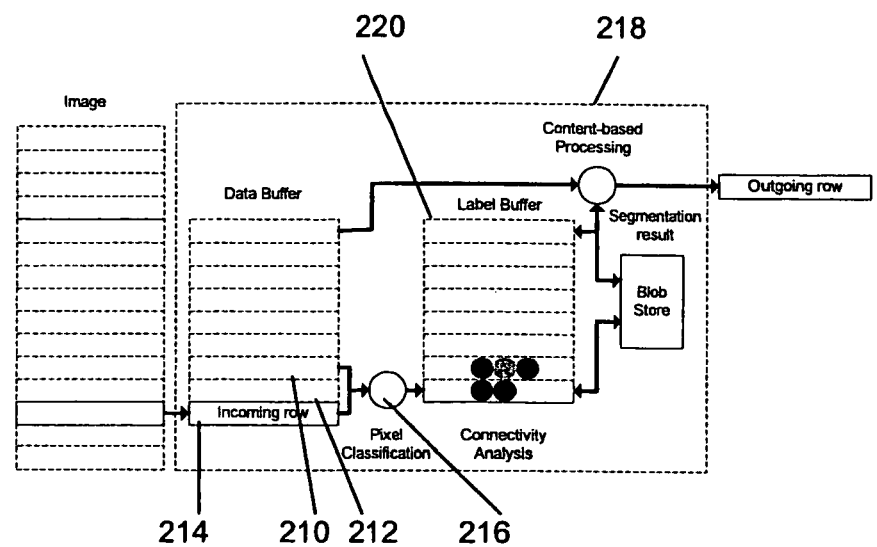
FIG. 16 is a schematic representation of an architecture for raster-scan processing.

For many practical applications, an image is accessed in a sequential manner, from left to right, and from top to bottom, such as a raster scan mode. The whole image may not be available simultaneously, for example due to memory constraints. As an alternative to a full image or to a slice or segment analysis where a significant number of lines are available, a scan-line based processing can be used. A scan-line based process is advantageous in minimizing a scan-to-print or a scan-to-display delay. FIG. 16 shows an implementation using a scan line approach. In this approach, some rows 210, 212 and 214 (preferably at least three, which is the mask size of the Sobel operator) of image data can be held in a modular (rotational) buffer 216, for example, in a conventional processor 218 such as that used for processing the scanned image. In addition, a label buffer 220 (preferably having at least two rows) is included for holding results of pixel classification and connectivity analysis. Such an implementation with an N-row data buffer can be considered as a pipeline with a delay of N rows. After an initial fill-up delay of N rows, it works in a one-row in and one-row out fashion. The actual number of rows to be used in the buffer will be selected based in part on the trade-off between cost and performance.

Pixel classification in the scan-line approach preferably uses the histogram-based thresholding, which can be easily modified to fit this processing mode. Two possible ways to build or update the histogram include using only pixels inside the buffer (window) to calculate the histogram, giving a histogram of the windowed image. Another way is accumulative, adding pixel counts to the histogram when a new row comes in. At the end of the image, the histogram becomes a global histogram. In either method, the histogram and consequently the thresholds are updated for each new row. The number of rows is preferably not so small as to make the histogram statistically insignificant. As the histogram is being created or after the global histogram is complete, the pixels can be characterized using the same process as described previously.

Figure 17:
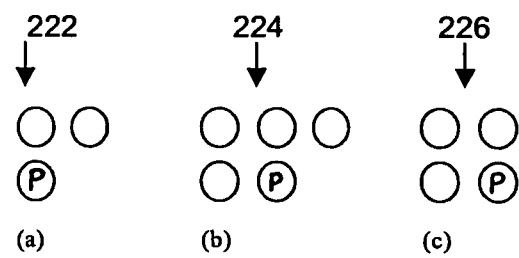
FIG. 17 is a schematic representation of labeled and un-labeled pixels.
Figures 18, 20:
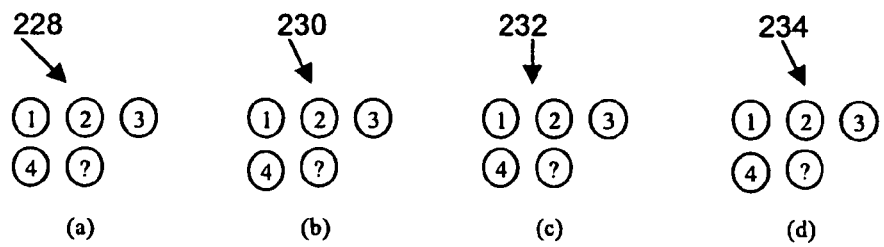
FIG. 18 is a schematic representation of different possible pixel classifications that may lead to erroneous region boundaries.
FIG. 20 is a representation of pseudo-code for a joint operation.

The connectivity analysis in this raster scan order can be carried out using sequential labeling [described more fully in Berthold K. P. Horn, Robot Vision, The MIT Press, Cambridge, Mass., 1986]. In one form, every new pixel coming in has only two, three or four neighboring pixels, 222, 224, and 226, respectively, available depending on its location in the row, as illustrated in FIG. 17. The unknown and therefore unlabeled (hereafter "unassigned") pixel with only two known neighboring pixels is a left boundary, the unknown pixel with only three known and labeled or assigned pixels is a right boundary and the rest are interior pixels. Because of the unknown pixels, Blob characterization may produce artifacts based on seeing only a partial Blob, and a connected Blob may be treated as disconnected Blobs before encountering the joining pixels, as illustrated in FIG. 18. FIG. 18 shows the incoming unknown pixels with a "?", and situations 228 and 230 where the incoming unknown pixel is part of a Sub-Blob. It also shows situations 232 and 234 where the incoming unknown pixel is part of a Blob. The unshaded pixels are background pixels.

The first source of artifacts from a Blob mischaracterization occurs when the Blob size is larger than the buffer and an undesired decision is due to incompleteness of data. There are possibly two ways to deal with it. The first is to have a special tag or title of "big Blob" for all Blobs larger than the size of the buffer and choose appropriate action in those applications, for example hold titles and/or labels. The second is to characterize a pixel based on available information and to design a gradual transition scheme in case of changing characterization later. Preferably, the number of buffer rows is equal to or larger than the largest font size the algorithm is expected to analyze in order to improve the character-wise consistency of enhancement.

However, even for a Blob within the size of buffer, the second source of artifacts may still arise. The cases that will justify a joint operation are illustrated in FIG. 18, where the gray scale shown in the Figure and the number represent a pixel's label and sub-Blob ID, respectively.

Figure 19:
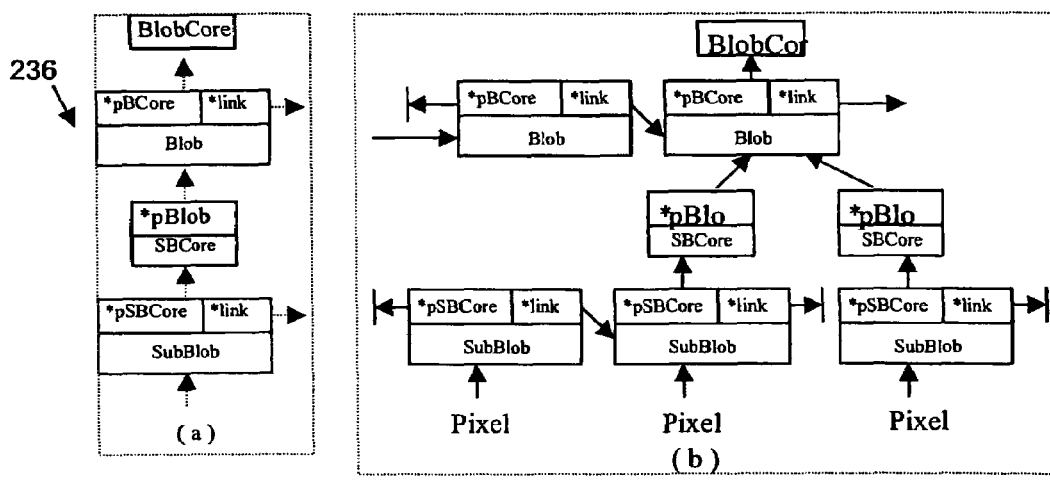
FIG. 19 is a schematic representation of a two-level linked list and an example process.

Preferably, the system keeps track of pixels belonging to a Blob and sub-Blob in order to perform a joint operation. Since there may be a large number of pixels belonging to a Blob and this type of operation may be done many times during a Blob's lifetime, it is preferred to avoid reassignment to every pixel of the Blobs involved. Towards this objective, a two-level linked list 236 can be used, as shown in FIG. 19. Every pixel will be assigned a pointer tag pSB, which will be an address to a SubBlob data structure. For a new incoming pixel with label x, comparisons with its neighbors (as illustrated in FIG. 17) will be performed. If one of its neighbors possesses the same label x, the address tag of the neighbor will be copied to the pixel. Otherwise, a new data item of SubBlob will be created and its address assigned to the pixel. In both cases, the SubBlob associated with the incoming pixel will be updated, which will in turn update its top-level Blob. Furthermore, the pixel clique will be examined to see if a joint operation is desirable. The joint operation with the data structure consists of traversal of links and pointer operations without the need of reassignment of all the pixels involved. Possible pseudo-code 238 for the joint operation is sketched in FIG. 20.

Figure 21:
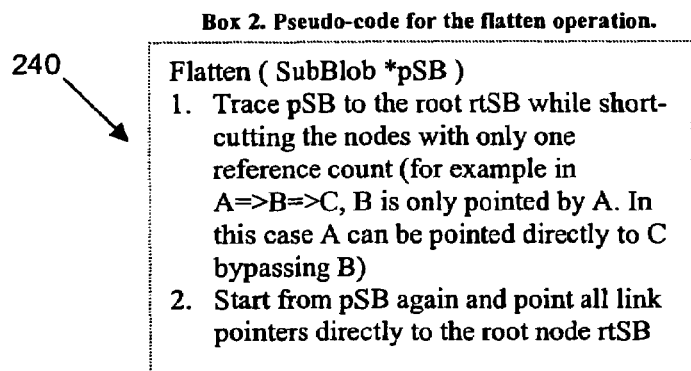
FIG. 21 is a representation of pseudo-code for a flattening operation.
Figure 22:
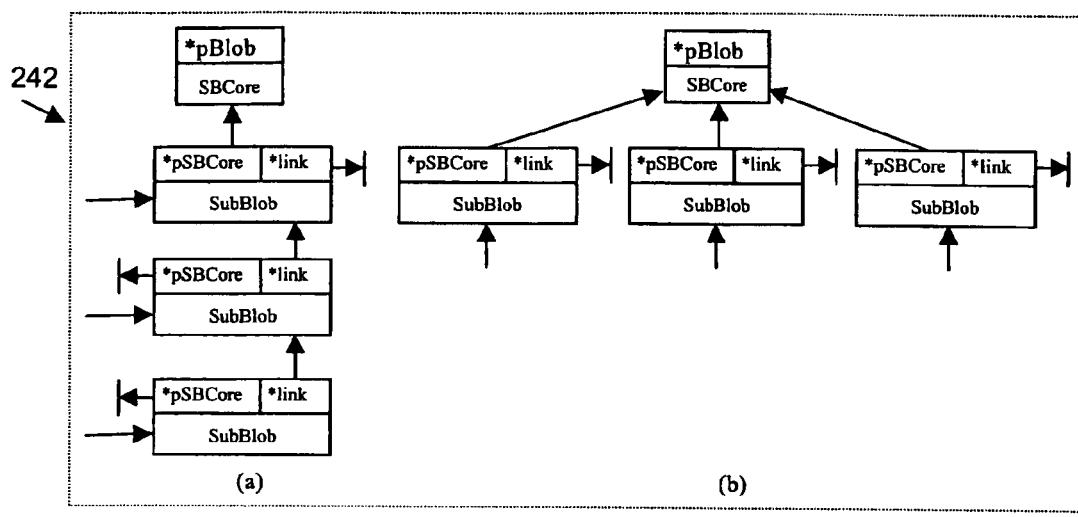
FIG. 22 is a representation of a flattening operation on a link before and after the operation.
Figure 23:
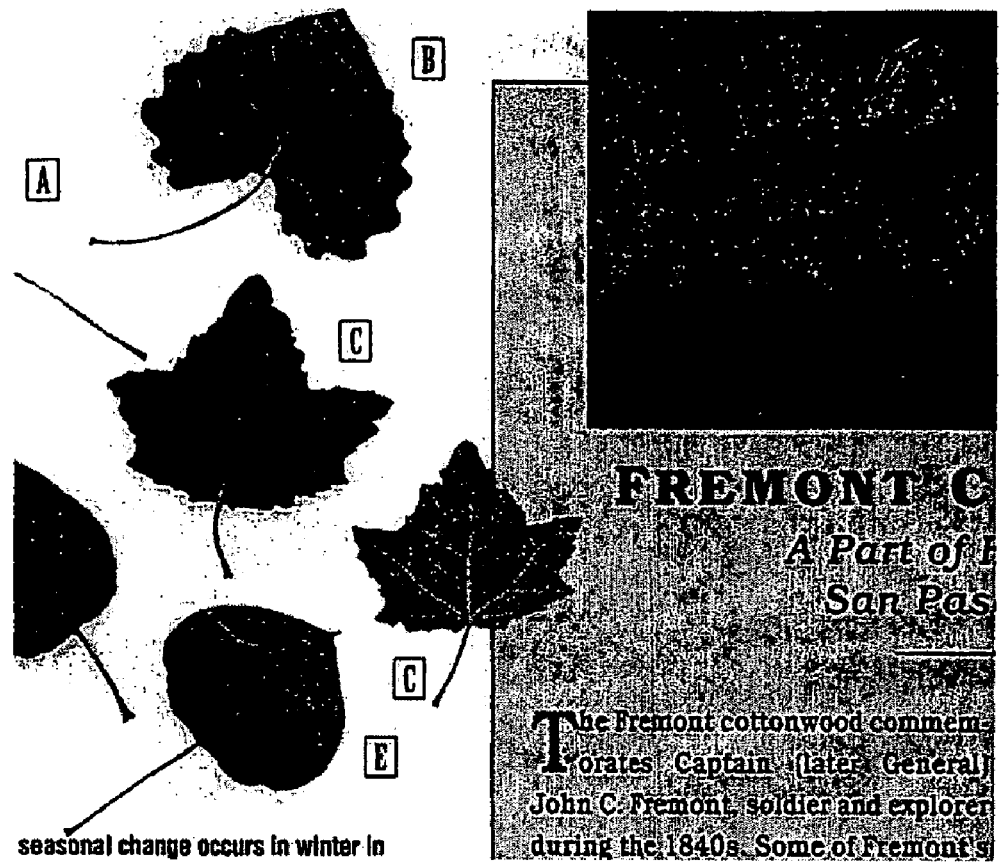
FIG. 23 is a representation of a sample image that may be analyzed with the methods and apparatus of the present inventions.

As the number of joint operations on a sub-Blob/Blob increases, so does the length of the links. Longer links may slow down any future joint and retrieval operations involving the sub-Blob/Blob. Since a sub-Blob/Blob usually includes a large number of pixels, tracing a long link is preferably minimized or avoided. Therefore, a "flatten" operation is embedded in joint and retrieval to introduce a short cut from nodes directly to the root and therefore shorten the link for future operations. The pseudo-code 240 for the flattening operations on a sub-Blob is sketched in FIG. 21. FIG. 22 illustrates the flattening operation 242 by a simple example. An identical approach is preferably applied to Blobs.

The description of the methods and apparatus of the present inventions can be applied to the use of scanners for scanning or copying documents, especially to identify an image that is text only or predominantly text, but it should be understood that one or more aspects of these methods and apparatus may also be suitable for other applications, such as analyzing and characterizing data files that have been previously scanned or created in such a way that any differentiation between all text and all graphic no longer exists.

Figure 24:
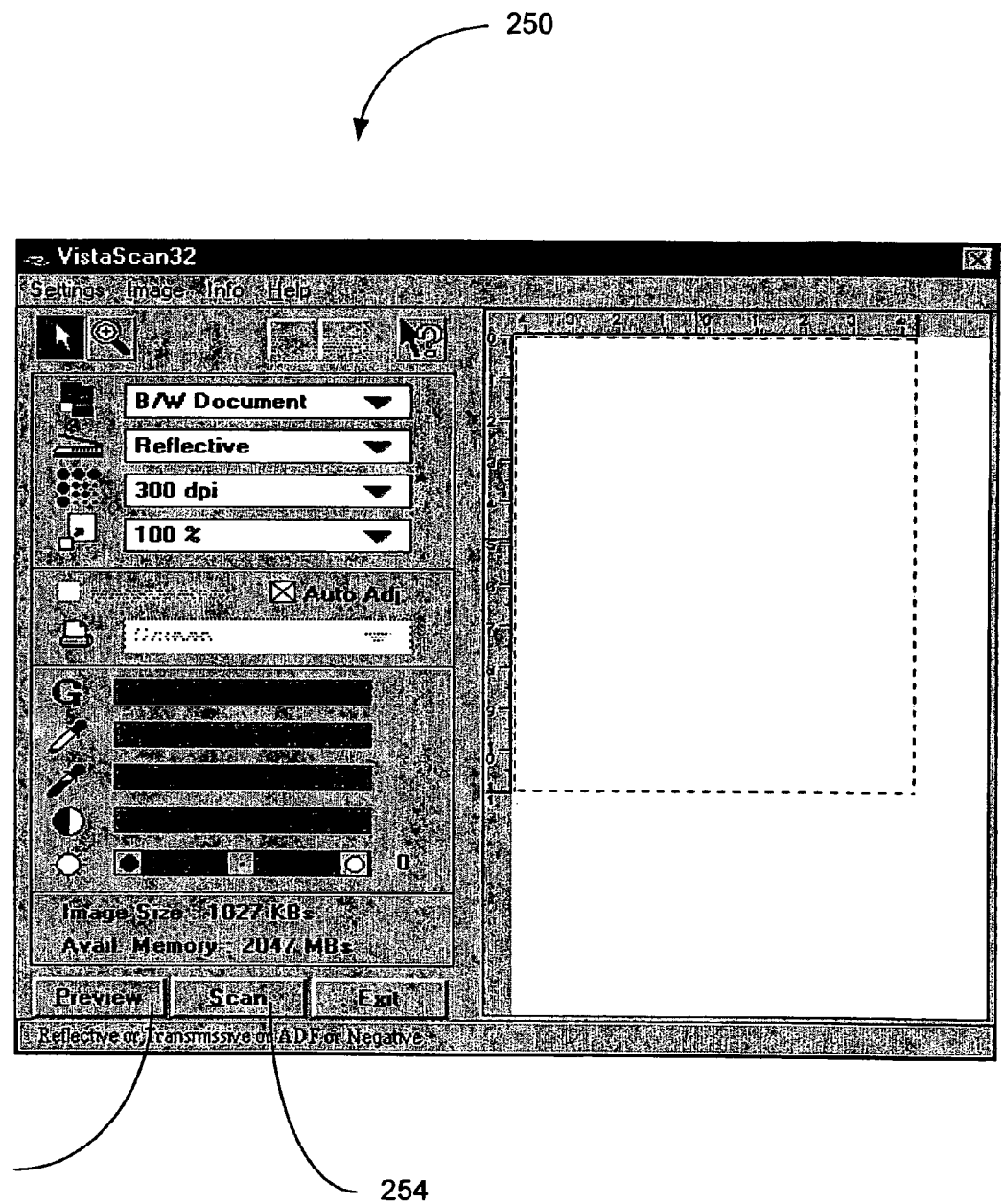
FIG. 24 is a representation of a user interface for an image scanner which allows various levels of user control over the settings and the scan of an image.
Figure 25:
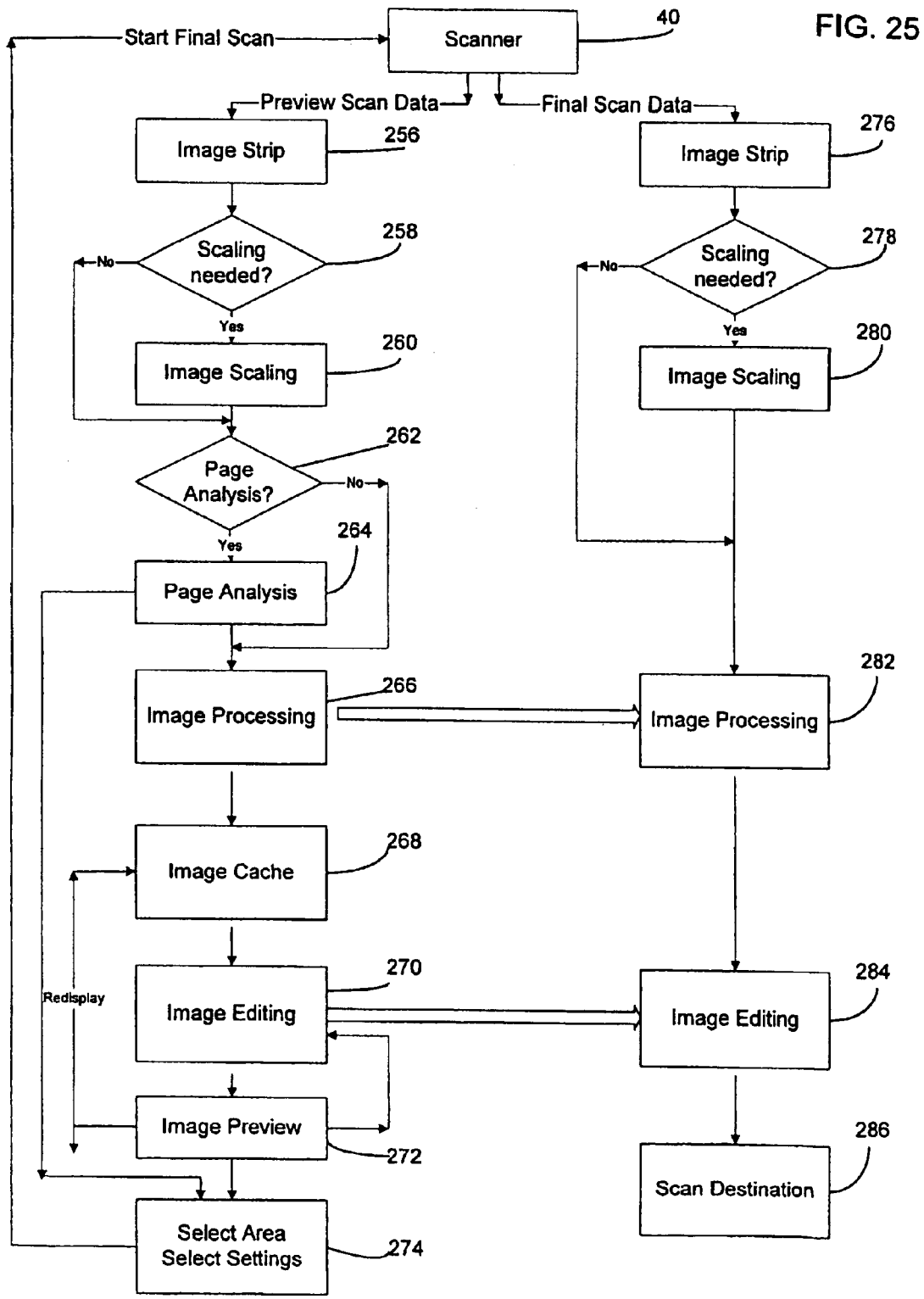
FIG. 25 is a flow chart depicting an example process followed by one aspect of the present inventions for scanning and analyzing an image.

In one example for classifying an image as text, graphic or both, such as may occur in a scan sequence, it may be desirable to analyze the image to allow the processor to more closely control the scanner in making a preview and/or final scan. The scanner 40 (FIG. 25) may come with software or otherwise include a user interface 250 (FIG. 24) which may be used to select a preview scan 252 and a final scan 254. The user interface 250 is conventional, and preview and final scans are well-known. On the preview scan, preview scan data is fed from the scanner 40 to the CPU 32 in the form of one or more image strips 256 (FIG. 25). The image data can be received and processed by the CPU 32 in segments, blocks or strips as the scan is progressing, and even on a line-by-line basis, so that the image analysis and characterization can be carried out real-time. Each image strip is preferably fed to the CPU real-time as the scan is progressing, and is preferably multiple lines long. For example, each image strip may represent a percentage, such as 25 percent, of the entire image to be scanned, and may be several hundred lines worth of image. The size of the image strip may be determined in part by buffer size and the like.

In one preferred form of the inventions, the data can be processed by the CPU 32 as though all the data received after a start code or instruction and before a stop code or instruction is received is treated as a single image, even if the data is received in blocks or slices of data. For example, the CPU 32 can be instructed to begin processing upon the receipt of the first group of lines of image, for example 25 or 100 lines. The CPU can continue processing each additional line or each additional group of lines in sequence until the end of the image is received. Alternatively, the CPU 32 can control the image analysis by controlling how image segments are fed into the image analysis process, the block or slice size processed, or in other ways.

In some circumstances, the image can be properly characterized even before the scan has finished. For example, if the image is characterized as mixed, e.g. a mixture of text and photo, part way through the scan, so the image will not be characterized as either all text or all photo, according to the criteria for making such a characterization, further analysis of the image may be unnecessary. The image data can then be sent to the CPU 32 for appropriate disposition outside of the image analysis and characterization process. While the image data can be received, analyzed and characterized after the scan has finished, real-time or segmented analysis is preferred in order to reduce the overall time used for processing the image data.

The CPU checks 258 to see if any scaling is necessary, in which case the image is scaled 260 to the appropriate size for further processing. If no scaling is necessary, the image scaling step 260 is bypassed.

The CPU then checks 262 to see if a page analysis is to be carried out. A page analysis may not be necessary if the user has manually entered settings for the scanner based on knowledge of the image to be scanned, or if the proper settings have otherwise been set for the scanner, for example. The page analysis 264, described more fully below, is carried out if it is not bypassed, and the results are used by the CPU to process the image in an image processing step 266. The results of the image processing step 266 are stored in an image cache 268 for subsequent processing 270, such as for sizing, sharpening, tone adjustment and the like. The processed image is then provided to the user interface 250 in an image preview step 272 followed by further editing 270 by the user or approval and storage in the image cache 268 if there are no further changes. When the last preview is approved, the image area is established and the scan settings are established at 274 and the processor returns to the scanner 40 for a final scan.

On a final scan, each image strip 276 is sent to the CPU and checked 278 for any necessary scaling. Scaling is done at 280 followed by image processing 282, as necessary, and any image editing 284, after which the image is sent to the scan destination 286. Scanning can then be terminated or repeated, as desired.

It should be noted that having a preview and final scan sequence are relatively traditional. However, it is possible that the preview and final scans can be collapsed into a single series of steps, including scaling analysis, page analysis, image processing and editing, image preview followed by possible further image editing and final delivery to a destination. Other combinations of steps are possible as well. For example, as the first scan, the image may be scanned at the maximum optical resolution and maximum depth supported by the scanner, and the image saved in a cache. The resolution and/or depth is then reduced to create the preview image. When a final scan is requested, the image in the cache may be processed to get the desired result, instead of starting a new scan at the optimal settings for the image type. This approach may be used when the scanner does not support a preview/final scan sequence, for example sheet-fed scanners that eject the sheets on which the images are found.

Figure 26:
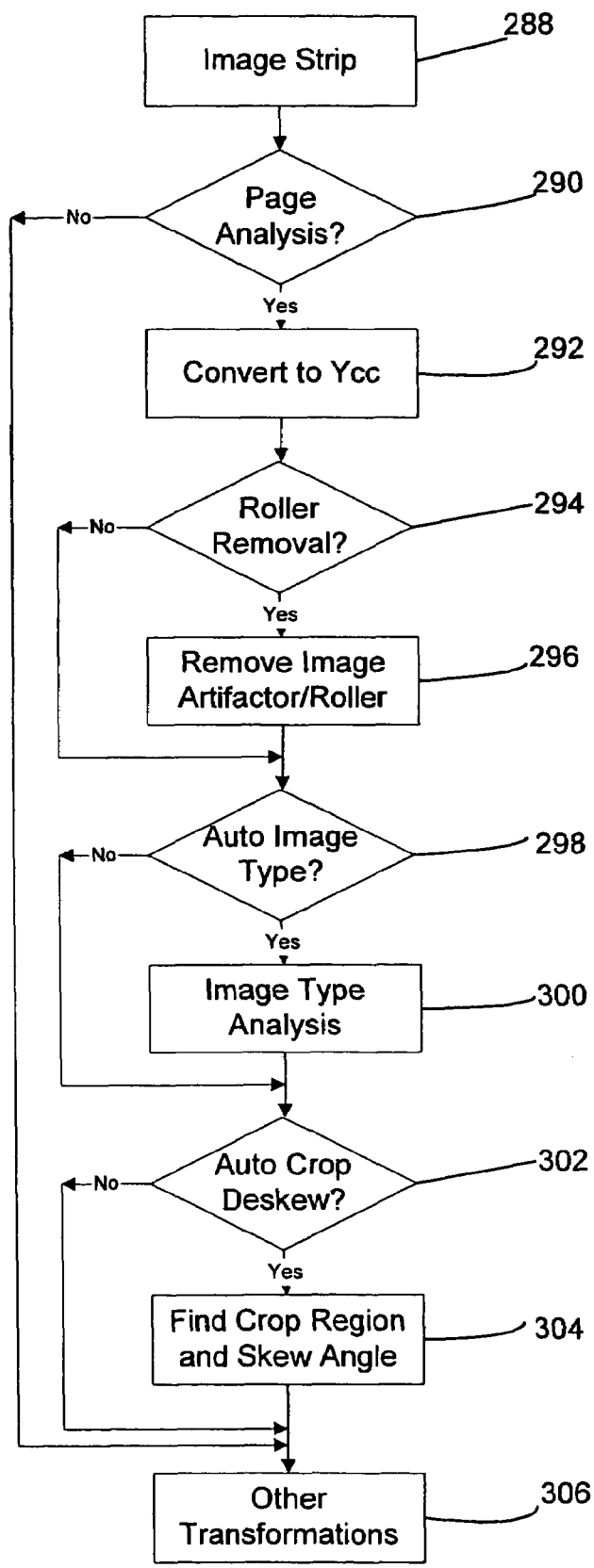
FIG. 26 is a flow chart depicting steps of a method that can be carried out on an image, including analyzing the image for text and graphic.

Considering the page analysis and editing process in more detail, an image strip 288 (FIG. 26) such as that described above is fed to the CPU 32. The CPU checks 290 to see if a page analysis is to be carried out, and if so, the CPU converts 292 the image data to luminance form, using, for example, the established RGB (Red, Green, Blue) conversion factor 0.299*R+0.587*G+0.114*B. This is the conversion factor that is conventionally used with the "sRGB" standard. If page analysis is not to be carried out, the CPU skips the luminance conversion step. The CPU then checks 294 to see if any roller artifacts need to be removed. Roller artifacts may be present in a sheet fed scanner where the sheet may be smaller than normal size. Roller artifacts are removed 296 if present, after which the CPU checks 298 if the page analysis and characterization process is to be applied to the image strip. If so, the image strip is analyzed 300, as described more fully below, and if not, the image type analysis step 300 is bypassed. The CPU then checks 302 to see if the image needs to be auto-cropped or de-skewed, and if so the image is processed 304 accordingly. The CPU then carries out other transformations 306, as appropriate.

These methods and apparatus make easier the proper setting of a scanner for acquiring image data corresponding to an image of a given type. Where the image is analyzed and characterized according to a particular type, the image can then be scanned to acquire image data having the most desirable form for the particular image type. Moreover, the image analysis and characterization and subsequent scanning can be carried out with little or no user intervention, for example using pre-established settings correlated to known image types. Once the image type is known, the proper settings can be applied to the scanner and the desired image data acquired and stored or sent to the appropriate destination. Alternatively, an image can be scanned once using optimum settings for as many likely formats as possible, after or during which the image will be characterized. Once the image is characterized to a suitable level of certainty, the image data could be transformed to a form suitable for the intended destination.

Having thus described several exemplary implementations of the invention, it will be apparent that various alterations and modifications can be made without departing from the inventions or the concepts discussed herein. Such operations and modifications, though not expressly described above, are nonetheless intended and implied to be within the spirit and scope of the inventions. Accordingly, the foregoing description is intended to be illustrative only.

What is claimed is:

1. A method of processing an image of elements, comprising:
    assigning each of multiple ones of the elements a respective element label selected from a set of at least three element labels that includes at least one edge element label;
    grouping spatially connected ones of the elements into respective blobs based on the element labels assigned to the elements, wherein each of the blobs is assigned a respective one of at least two blob labels; and
    processing ones of the elements based at least in part on the blob labels assigned to the blobs and the element labels assigned to the elements;
    wherein the assigning, the grouping, and the processing are performed by a processor.

2. The method of claim 1, further comprising segmenting spatially connected ones of the elements in each of the blobs into respective sub-blobs based on the labels assigned to the elements, wherein each of the sub-blobs is assigned to a respective one of at least two sub-blob labels, wherein the processing is based at least in part on the sub-blob labels assigned to the sub-blobs.

3. The method of claim 2, wherein the segmenting comprises segmenting adjacent ones of the elements into a respective one of a black sub-blob label, a gray sub-blob label, a gray edge sub-blob label, a color sub-blob label, a color edge sub-blob label, and a white sub-blob label.

4. The method of claim 2, wherein the grouping comprises assigning at least some adjacent ones of the elements a background blob label, and the segmenting comprises segmenting at least some adjacent ones of the elements assigned the background blob label into a respective one of the sub-blob labels based on the element labels assigned to the elements.

5. The method of claim 2, wherein the grouping comprises labeling at least some adjacent ones of the elements with a non-background blob label, and the segmenting comprises assigning a respective one of the sub-blob labels to at least some adjacent ones of the elements labeled with the non-background label based on the element labels assigned to the elements.

6. The method of claim 5, wherein the segmenting comprises labeling adjacent ones of the elements assigned the non-background blob label with a respective one of an edge element sub-blob label, a color element sub-blob label, a gray element sub-blob label, and a black element sub-blob label.

7. The method of claim 5, further comprising classifying each of multiple ones of the blobs into a respective one of at least two blob type classes based on the blob label assigned to the blob and statistics of the sub-blobs linked to the blob.

8. The method of claim 2, wherein the segmenting comprises labeling at least some adjacent ones of the elements with an edge sub-blob label.

9. The method of claim 8, wherein the segmenting comprises labeling at least some neighboring ones of the elements with the edge sub-blob label.

10. The method of claim 8, wherein the labeling is based on an eight-neighbors system connectivity analysis performed for each of the elements.

11. The method of claim 8, wherein the labeling comprises labeling the at least some adjacent ones of the elements with a respective label selected from a white edge sub-blob label and a gray edge sub-blob label.

12. The method of claim 8, wherein the segmenting comprises identifying elements that are assigned the edge element label and are adjacent at least two other elements each of which is assigned the edge element label.

13. The method of claim 8, wherein the segmenting comprises labeling ones of the elements having similar element labels with respective ones of the sub-blob labels image characteristic.

14. The method of claim 13, wherein the labeling comprises identifying ones of the elements assigned an identical element label selected from a color element label, a gray element label, and a black element label.

15. The method of the claim 14, wherein the labeling comprises identifying spatially connected ones of the elements that are assigned a mutual one of the selected element labels.

16. The method of claim 15, wherein the identifying of spatially connected ones of the elements comprises identifying ones of the elements that are assigned the mutual element label and are connected through other ones of the elements assigned the mutual element label.

17. The method of claim 16, wherein the grouping comprises labeling connected ones of the identified elements assigned the mutual element label with a non-background sub-blob label.

18. The method of claim 13, wherein the segmenting comprises identifying connected ones of the elements having at least one element label in common.

19. The method of claim 18, wherein the segmenting comprises assigning a respective one of the sub-blob labels to each set of the connected elements having the at least one element label in common.

20. The method of claim 18, further comprising determining for each of multiple ones of the blobs a respective number of constituent ones of the connected elements having a first one of the element labels in common.

21. The method of claim 20, further comprising for each of multiple ones of the blobs determining a respective second number of constituent ones of the connected elements that have a second one of the element labels in common, and comparing the respective first and second numbers of elements.

22. The method of claim 21, further comprising identifying elements that have the first element label in common and are adjacent to elements having the second element label in common.

23. The method of claim 21, wherein the processing comprises changing attribute values of the elements having the second element label in common to values that are closer to corresponding attribute values of the elements having the first element label in common.

24. The method of claim 23, wherein the changing comprises changing the attribute values of the elements having the second element label in common by multiplying their attribute values by a number less than one.

25. The method of claim 23, wherein the changing comprises changing the attribute values of the elements having the second element label in common to an average of the corresponding attribute values of the elements having the first element label in common.

26. The method of claim 21, wherein the first element label is a black element label and the second element label is different from the black element label.

27. The method of claim 26, further comprising for each of the blobs comparing number of connected elements labeled with the second element label to number of connected elements labeled with the black element label.

28. The method of claim 2, wherein:
the grouping comprises labeling ones of the elements with a background blob label;
the assigning comprises assigning ones of the elements the edge element label; and
the segmenting comprises segmenting connected ones of the elements assigned the edge element label to an edge sub-blob label.

29. The method of claim 28, wherein the assigning comprises labeling ones of the elements with a black element label.

30. The method of claim 28, wherein the assigning comprises labeling each of multiple ones of the elements with a respective one of a gray element label and a gray edge element label.

31. The method of claim 28, wherein the labeling of ones of the elements with the edge element label comprises assigning each of multiple ones of the elements to a respective one of a white edge element label, a gray edge element label, and a color edge element label.

32. The method of claim 28, wherein the segmenting comprises assigning a respective sub-blob label and a respective blob pointer to each of multiple ones of the elements such that identical blob pointers are assigned to connected ones of the elements assigned an identical sub-blob label.

33. The method of claim 28, wherein the assigning comprises applying a gradient operator to ones of the elements to produce gradient data and labeling ones of the elements with the edge element label based on the gradient data.

34. The method of claim 2, wherein ones of the elements are associated with respective grayscale image data.

35. The method of claim 34, wherein the assigning comprises assigning ones of the elements a black element label based on the grayscale image data.

36. The method of claim 34, wherein the assigning comprises assigning ones of the elements a respective one of a gray element label and a gray edge element label.

37. The method of claim 34, wherein the assigning of ones of the elements the edge element label comprises labeling each of multiple ones of the elements with a respective one of a white edge element label, a gray edge element label, and a color edge element label.

38. The method of claim 34 wherein the assigning comprises applying a gradient operator to ones of the elements to produce gradient data and labeling ones of the elements with the edge element label based on the gradient data.

39. The method of claim 34, further comprising assigning a respective sub-blob label and a respective blob pointer to each of multiple ones of the elements such that identical pointers are assigned to connected ones of the elements assigned an identical sub-blob label.

40. The method of claim 34, wherein the segmenting comprises identifying adjacent ones of the elements assigned the edge element label, and labeling the identified adjacent elements with a respective ones of the sub-blob labels.

41. The method of claim 34, further comprising for each of multiple ones of the blobs:
determining a respective number of connected ones of the constituent elements assigned a first one of the element labels;
determining a respective second number of connected ones of the constituent elements assigned a second one of the element labels; and
classifying ones of the blobs based on comparisons of the respective first and second numbers of elements.

42. The method of claim 1, wherein the elements correspond to pixels of the image.

43. The method of claim 1, wherein the assigning comprises determining a white threshold value from luminance values associated with ones of the elements.

44. The method of claim 43, wherein the assigning comprises determining a black threshold value from the determined white threshold value.

45. The method of claim 1, wherein the assigning comprises labeling ones of the elements with respective ones of the element labels based at least in part on luminance values respectively associated with the elements.

46. The method of claim 45, wherein the labeling comprises comparing the luminance values to a white threshold value.

47. The method of claim 45, wherein the labeling comprises assigning each of multiple ones of the elements a respective one of a black element label, a white element label, and a gray element label based on comparisons of the luminance values to a white threshold and a black threshold.

48. The method of claim 45, wherein the labeling comprises comparing the luminance values to a black threshold value.

49. The method of claim 1, wherein the labeling comprises assigning each of multiple ones of the elements a respective one of a black element label, a white element label, and a color element label.

50. The method of claim 1, wherein the grouping comprises grouping spatially connected ones of the elements that are assigned element labels within a first subset of the element labels into a respective one of the blobs assigned a first blob label, and grouping spatially connected ones of the elements that are assigned element labels within a second subset of the element labels into a respective one of the blobs assigned a second blob label.

51. The method of claim 1, wherein the grouping is based on a respective eight-neighbors system connectivity analysis performed for each of the elements.

52. The method of claim 1, wherein the grouping comprises labeling at least some of adjacent ones of the elements with a background blob label.

53. The method of claim 52, wherein the grouping comprises labeling adjacent ones of the elements that are outside the background blob label with a non-background blob label.

54. The method of claim 1, wherein the assigning comprises applying a gradient operator to ones of the elements to produce gradient data and labeling ones of the elements with the edge element label based on the gradient data.

55. The method of claim 1, wherein the assigning comprises determining a color threshold based at least in part on color values respectively associated with ones of the elements.

* * * * *

UNITED STATES PATENT AND TRADEMARK OFFICE
CERTIFICATE OF CORRECTION

PATENT NO. : 7,672,022 B1  Page 1 of 1
APPLICATION NO. : 09/709685
DATED : March 2, 2010
INVENTOR(S) : Jian Fan It is certified that error appears in the above-identified patent and that said Letters Patent is hereby corrected as shown below:

In column 26, line 13, in Claim 15, after "of" delete "the".

Signed and Sealed this
Tenth Day of April, 2012

David J. Kappos
*Director of the United States Patent and Trademark Office*